(12) United States Patent
Li et al.

(10) Patent No.: US 11,951,618 B2
(45) Date of Patent: Apr. 9, 2024

(54) MULTI-PROCEDURE INTEGRATED AUTOMATIC PRODUCTION LINE FOR HARD ALLOY BLADES UNDER ROBOT CONTROL

(71) Applicants: Qingdao University of Technology, Qingdao (CN); Ningbo Sanhan Alloy Material Co., Ltd., Ningbo (CN)

(72) Inventors: Changhe Li, Qingdao (CN); Teng Gao, Qingdao (CN); Liang Luo, Qingdao (CN); Lizhi Tang, Qingdao (CN); Yanbin Zhang, Qingdao (CN); Weixi Ji, Qingdao (CN); Binhui Wan, Qingdao (CN); Shuo Yin, Qingdao (CN); Huajun Cao, Qingdao (CN); Bingheng Lu, Qingdao (CN); Xin Cui, Qingdao (IL); Mingzheng Liu, Qingdao (CN); Jie Xu, Qingdao (CN); Huiming Luo, Qingdao (CN); Haizhou Xu, Qingdao (CN); Min Yang, Qingdao (CN); Huaping Hong, Qingdao (CN); Yuying Yang, Qingdao (CN); Haogang Li, Qingdao (CN); Wuxing Ma, Qingdao (CN); Shuai Chen, Qingdao (CN)

(73) Assignees: Qingdao University of Technology, Qingdao (CN); Ningbo Sanhan Alloy Material Co., Ltd., Ningbo (CN)

( * ) Notice: Subject to any disclaimer, the term of this patent is extended or adjusted under 35 U.S.C. 154(b) by 469 days.

(21) Appl. No.: 17/404,604

(22) Filed: Aug. 17, 2021

(65) Prior Publication Data
US 2022/0055208 A1 Feb. 24, 2022

(30) Foreign Application Priority Data
Aug. 24, 2020 (CN) .......................... 202010859250.6

(51) Int. Cl.
*B25J 9/00* (2006.01)
*B08B 3/10* (2006.01)
(Continued)

(52) U.S. Cl.
CPC ............. *B25J 9/0084* (2013.01); *B08B 3/102* (2013.01); *B24B 3/36* (2013.01); *B24B 41/066* (2013.01);
(Continued)

(58) Field of Classification Search
CPC . B25J 9/0084; B25J 5/02; B25J 9/1679; B25J 11/0065; B08B 3/102; B24B 3/36; B24B 41/066
(Continued)

(56) References Cited

U.S. PATENT DOCUMENTS 4,711,016 A * 12/1987 Genschow ......... B23Q 3/15539
483/53
5,407,415 A * 4/1995 Spishak ............... G05B 19/423
83/368
(Continued)

*Primary Examiner* — Phong H Nguyen
(74) *Attorney, Agent, or Firm* — M&B IP Analysts, LLC

(57) ABSTRACT

A multi-procedure integrated automatic production line for hard alloy blades under robot control is provided. The production line includes a rail-guided robot. A cutter passivation device and a blade cleaning and drying device are arranged on one side of the rail-guided robot. A blade-coating transfer table, a blade coating device, a blade boxing transfer table, a blade-tooling dismounting device and a blade boxing device are sequentially arranged on another side of the rail-guided robot. The blade-tooling dismounting device is arranged on one side of the blade boxing transfer table. The production line further includes squirrel-cage toolings for carrying the blades. The squirrel-cage tooling that are loaded with the blades can run among the cutter passivation device, the blade cleaning and drying device, the blade-coating transfer table and the blade boxing transfer
(Continued)

table. The blades after being treated through the blade-tooling dismounting device are sent to the blade boxing device.

10 Claims, 20 Drawing Sheets

(51) Int. Cl.
*B24B 3/36* (2006.01)
*B24B 41/06* (2012.01)
*B25J 5/02* (2006.01)
*B25J 9/16* (2006.01)
*B25J 11/00* (2006.01)

(52) U.S. Cl.
CPC ............... *B25J 5/02* (2013.01); *B25J 9/1679* (2013.01); *B25J 11/0065* (2013.01)

(58) Field of Classification Search
USPC ........................................................ 76/104.1
See application file for complete search history.

(56) References Cited

U.S. PATENT DOCUMENTS

| | | | |
|---|---|---|---|
| 2012/0251273 A1* | 10/2012 | Hulslander | B23P 19/001 414/222.09 |
| 2015/0044944 A1* | 2/2015 | Chen | B24B 21/008 451/64 |
| 2017/0057026 A1* | 3/2017 | Shen | B23P 21/004 |
| 2019/0332097 A1* | 10/2019 | Canberi | G05B 19/4182 |

\* cited by examiner

MULTI-PROCEDURE INTEGRATED AUTOMATIC PRODUCTION LINE FOR HARD ALLOY BLADES UNDER ROBOT CONTROL

CROSS REFERENCE TO RELATED APPLICATION

This patent application claims the benefit and priority of Chinese Patent Application No. 202010859250.6 filed on Aug. 24, 2020 the disclosure of which is incorporated by reference herein in its entirety as part of the present application.

TECHNICAL FIELD

The present disclosure relates to the field of automatic production technologies for cutters, in particular to a multi-procedure integrated automatic production line for hard alloy blades under robot control.

BACKGROUND ART

Hard alloy cutters have a great variety and different classification methods. In the metal cutting process, the hard alloy cutters not only bear the large cutting force and the high temperature, but also bear impact load and mechanical friction. Therefore, the materials of the hard alloy cutters must have following performances, such as high hardness, high wear resistance, sufficient strength and toughness, good high-temperature heat resistance, good chemical stability and good thermal conductivity.

The technology for passivating cutting edges of the cutters is a very important technology which has not generally caught people's attention. The cutting edges of the hard alloy cutters which are sharpened by a diamond grinding wheel have different degrees of microcosmic notches. There exists the higher requirement for performance and the stability of cutters for high-speed machining. Particularly, the cutting edge of the hard alloy cutter that is coated should be passivated only before being coated, so as to guarantee the firmness and the service life of the coating. The passivation of the cutter aims to solve the defect of microcosmic notches of the cutting edge of the cutter after being sharpened, so that the sharp portions of the cutting edge are reduced or eliminated. So, the purpose that smoothness and flatness, sharpness, firmness as well as durability of the cutting edge is achieved. The coating for the cutters is a great change on an advance way of the machining industry. Furthermore, in the coating, a high-toughness substrate of the cutter is coated with a thin layer having one, two or even multiple layers of materials that are high hardness, high wear-resistance and high temperature-resistance. So, the cutter has all-round and good comprehensive performance. The machining efficiency and machining precision can be improved, the service life is prolonged, and the cost is reduced.

The material that is coated on a surface has high hardness and high wear resistance, and has a resistance to high temperature. Therefore, compared with an uncoated cutter, the coated cutter is enabled to have a higher cutting speed, so that the cutting machining efficiency is improved; or, the service life of the cutter can be prolonged under the same cutting speed. Due to the smaller friction coefficient between the coating material and the machined material, the cutting force of the coated cutter is smaller than that of the uncoated cutter. After the part is machined by the coating cutter, the machined surface of the part is good in quality.

An intelligent machining production line and a machining technology used for tungsten and molybdenum parts are provided by Antai Tianlong Tungsten and Molybdenum Science and Technology Co., Ltd. The intelligent machining production line includes an intelligent machining unit, an intelligent storage unit and a control device. The intelligent machining unit includes a mechanical arm and a machining center. A discharging table and an intelligent tool magazine are further arranged at the front end of the machining center, and used for placing workpieces and replacing tools of the machining center. The intelligent storage unit includes an intelligent tooling frame and an intelligent material frame, and is used for storing to-be-machined parts and machined workpieces. The control device includes a radio frequency identification system, a human-computer interface and a programmable controller. The control device is used for controlling the intelligent machining unit and the intelligent storage unit, reading and controlling actual data in the machining process in real time, and querying, positioning and changing related data in real time at a terminal. In the disclosure, intelligent control of the machining process is achieved, the requirement for simultaneous machining of different parts is met, the machining precision is high, the period is short, the production efficiency is high, the labor is saved, and the unmanned automatic circulation safety production is achieved. However, due to the small-batch manufacture, the flexible production demand is strong, and the production plan, dynamic control and organization management thereof are of great uncertainty. Meanwhile, there exits urgently-to-be-solved the processing technology and production management problems that the process route is long, the processing efficiency and the processing precision are low, the logistics turnover is frequent, the product inventory management and the control cost are high, material cost is high, etc.

A plane-type arc-deposition film coating production line for a wear-resistant layer on a cutter surface is proposed by Shanghai Jinke Nano-coating Technology Co., Ltd. The plane-type arc-deposition film coating production line includes an ultrasonic cleaning chamber, a conveying assembly-line and a film coating assembly-line. The conveying assembly-line and the film coating assembly-line are arranged in parallel. The conveying assembly-line includes a crane, a motor, sliding rods and circlips. The film coating assembly-line includes a drying chamber for blowing and sweeping, a surface defect monitoring table, a vacuum heating chamber, a glow cleaning chamber, a film coating chamber, a sample formation chamber and a coating surface detection table. The ultrasonic cleaning chamber is located in front of the drying chamber for blowing and sweeping. A workpiece is lifted into the ultrasonic cleaning chamber by the crane. The workpiece is lifted into the drying chamber for blowing and sweeping by the crane after being cleaned, and then the workpiece sequentially enters the surface defect monitoring table, the vacuum heating chamber, the glow cleaning chamber, the film coating chamber, the sample formation chamber and the coating surface detection table through sliding rods, so as to complete the whole production. So, a large number of vacuum chambers and air exhaust units are reduced, and the whole process can be automatically regulated and controlled. In this way, the production efficiency is improved, the labor cost is greatly saved, and the energy-saving effect is obvious. However, the overall stability, the film coating uniformity and the production efficiency of the film coating production line are low, and the cost of corresponding equipment is high. In addition, the film coating production line is only used for coating one target material, and the whole production line is only suitable for one type of target material, which cannot meet the current market demands.

A multi-station continuous production line for saw blades is provided by Anji Yuan Mo Grinding Machine Science and Technology Co., Ltd. The multi-station continuous production line for saw blades includes a blank loading device, a finished product output device, a control device, a blank cleaning device, a finished product cleaning device, a saw blade grabbing device and a grinding device. The blank cleaning device is arranged on one side of the blank loading device. The finished product cleaning device is arranged between the blank cleaning device and the finished product output device. The saw blade grabbing device is located on one side of the blank cleaning device and the finished product cleaning device. The grinding device is arranged on one side of the saw blade grabbing device and includes a plurality of grinding machines. The blank cleaning device, the grinding device and the finished product cleaning device are arranged on the same production line and cooperated with a six-axis mechanical arm to grab saw blades, so as to perform procedures on all stations, thereby replacing an original production mode that all machining procedures are separated. So, the automatic continuous production of the saw blades is achieved, which solves the technical problem that all the procedures are relatively independent to cause the low production efficiency.

In conclusion, the cutter production line has the disadvantages that the manual work cannot be completely separated, the time scheduling is unreasonable, the production line layout is unreasonable, and the occupied space is large. In addition, the cutter production line lacks the necessary passivation, the necessary cleaning and other procedures before being coated. Furthermore, there exits other disadvantages that the manual boxing is needed after the cutter production is completed.

SUMMARY

For the disadvantages in the prior art, the present disclosure aims to provide a multi-procedure integrated automatic production line for hard alloy blades under robot control, and the four main functions of blade passivation, blade cleaning and drying, blade coating and blade boxing are integrated. Carriers of blades in the production line are squirrel-cage toolings, so that one set of tooling can complete all procedures, and the structure of the production line can be simplified.

In order to achieve the above purpose, the present disclosure is realized through the following technical scheme.

A multi-procedure integrated automatic production line for hard alloy blades under robot control is provided. The automatic production line includes a rail-guided robot, where a cutter passivation device and a blade cleaning and drying device are arranged on one side of the rail-guided robot; a blade-coating transfer table, a blade coating device, a blade boxing transfer table, a blade-tooling dismounting device and a blade boxing device are sequentially arranged on an other side of the rail-guided robot; and the blade-tooling dismounting device is arranged on one side of the blade boxing transfer table; the automatic production line further includes squirrel-cage toolings for carrying blades; through the rail-guided robot, the squirrel-cage toolings loaded with the blades are enabled to move among the cutter passivation device, the blade cleaning and drying device, the blade-coating transfer table and the blade boxing transfer table; and the blades treated by the blade-tooling dismounting device are sent to the blade boxing device.

As further implementation mode, the cutter passivation device includes a passivation-device shell, a rotating disc mechanism, a spray gun mechanism and a grinding-material backflow mechanism; the rotating disc mechanism is mounted inside the passivation-device shell; the spray gun mechanism is mounted at a top of the passivation-device shell, and the grinding-material backflow mechanism is mounted on one side of the passivation-device shell.

As further implementation mode, the rotating disc mechanism includes a rotating disc transmission assembly, a stepping motor, tooling rotating assemblies and a large rotating disc; the stepping motor is connected with the large rotating disc and located above the large rotating disc; the tooling rotating assemblies used for connecting the squirrel-cage toolings are mounted at an edge of an upper surface of the large rotating disc; and the tooling rotating assemblies are connected with the rotating disc transmission assembly.

As further implementation mode, a collecting hopper is arranged at a bottom of the passivation-device shell; the grinding-material backflow mechanism is arranged on a side of the collecting hopper; the grinding-material backflow mechanism includes a blow-off pipe and a sand pumping pipe; an outlet side of a grinding fluid pipe extending out of a bottom of the collecting hopper is connected with a grinding fluid pump; and an other side of the grinding fluid pipe is connected with the blow-off pipe; the grinding fluid pump is connected with the sand pumping pipe; and the sand pumping pipe is connected with a sand discharge pipe device.

As further implementation mode, the blade cleaning and drying device includes a cleaning line support and a cleaning pool mounted above the cleaning line support; a cleaning line conveying belt is arranged on sides of the cleaning pool; a plurality of cleaning line tooling frames used for placing the squirrel-cage toolings are arranged on the cleaning line conveying belt; and a lifting device used for lifting the cleaning line tooling frames is mounted on one side of the cleaning line support.

As further implementation mode, the cleaning pool includes high-pressure flushing pools, drying pool assemblies and rinsing pools which are sequentially arranged; each of the drying pool assemblies includes an ultrasonic cleaning pool, a clean water rinsing pool and an ultrasonic rinsing pool which are sequentially arranged; and a rinsing assembly is arranged below the clean water rinsing pool; the rinsing assembly includes rinsing cross rods, each of the rinsing cross rods is fixed with a plurality of lifting parts; two ends of each of the rinsing cross rods are connected with up-and-down moving shafts; each of the up-and-down moving shafts are slidably connected with relatively immovable linear bearings; a bottom end of each of the up-and-down moving shafts is hinged to one end of a transmission rod; an other end of the transmission rod is hinged to one end of a triangular plate; and the triangular plate is rotated within a predetermined angle range.

As further implementation mode, the blade coating device includes a coating chamber; a plurality of planar target devices are mounted on inner walls of the coating chamber; fin heating pipes are mounted on side faces of the coating chamber; a rotating disc assembly is mounted in the coating chamber; a cooler is mounted at a top of the coating chamber; the coating chamber is connected with a gas tank and a diffusion pump; and the diffusion pump is connected with a vacuum pump and a roots vacuum pump.

As further implementation mode, the blade boxing device includes a blade-box cover-opening mechanism, a blade boxing mechanism, a stacking mechanism and a blade-box cover-closing mechanism; the blade-box cover-opening mechanism is located at one end of the blade boxing mechanism; the blade-box cover-closing mechanism is located at an other end of the blade boxing mechanism; and the stacking mechanism is located on one side of the blade-box cover-closing mechanism.

As further implementation mode, the blade-box cover-opening mechanism includes a cover opening and box pushing device, a blade-box stock bin and a blade-box inputting and conveying device; the blade-box stock bin is located above the blade-box inputting and conveying device; the cover opening and box pushing device is located on one side of the blade-box inputting and conveying device; the blade boxing mechanism includes a vibrated loading device, a blade-box conveying device, a blade-entering-box device and a blade-box pushing device; the blade-entering-box device is mounted above the blade-box conveying device; and the blade-entering-box device and the blade-box pushing device are arranged in parallel.

As further implementation mode, the blade-coating transfer table includes a transfer table support and a plurality of pneumatic chucks mounted above the transfer table support; the pneumatic chucks are used for fixing the squirrel-cage toolings; the blade-tooling dismounting device includes a clamping device, a tooling-dismounting visual device, a nut dismounting device and a tooling-dismounting robot; and the clamping device, the tooling-dismounting visual device and the nut dismounting device are mounted at a tail end of the tooling-dismounting robot.

The embodiment of the present disclosure has the following beneficial effects.

Firstly, in one or more embodiments of the present disclosure, the four main functions of blade passivation, blade cleaning and drying, blade coating and blade boxing are integrated, so that the service lives of the blades can be prolonged after the blades are passivated. In addition, the coating effect can be improved after the blades are passivated and cleaned before being coated.

Secondly, in one or more embodiments of the present disclosure, cutter transfer tables are additionally arranged between the cutter cleaning and drying device and a cutter coating device, and between the cutter coating device and the blade boxing device, so that the time control can be realized as a buffer, and conflicts among all procedures are avoided.

Thirdly, in one or more embodiments of the present disclosure, carriers of the blades are the squirrel-cage toolings; and in the complete set of production line before the blades are boxed, the blades are carried by the squirrel-cage toolings to be processed in different procedures, and each device in the production line is provided with components for positioning and fixing the squirrel-cage toolings, so that the effect of simplifying the working process of the whole production line is achieved.

Fourthly, in one or more embodiments of the present disclosure, the blade-tooling dismounting device is mounted between the blade boxing device and a blade boxing transfer table, so that the blades can be automatically placed into the blade boxing device from the squirrel-cage toolings. The nut dismounting device of the blade-tooling dismounting device is provided with a buffer component, so that the collision can be avoided.

BRIEF DESCRIPTION OF THE DRAWINGS

Attached figures of the description which form a part of the present disclosure are used for providing further understanding of the present disclosure, and the illustrative embodiments and description thereof in the present disclosure are used for explaining the present disclosure and are not to be construed as an undue limitation of the present disclosure.

REFERENCE SIGNS

Figure 1:
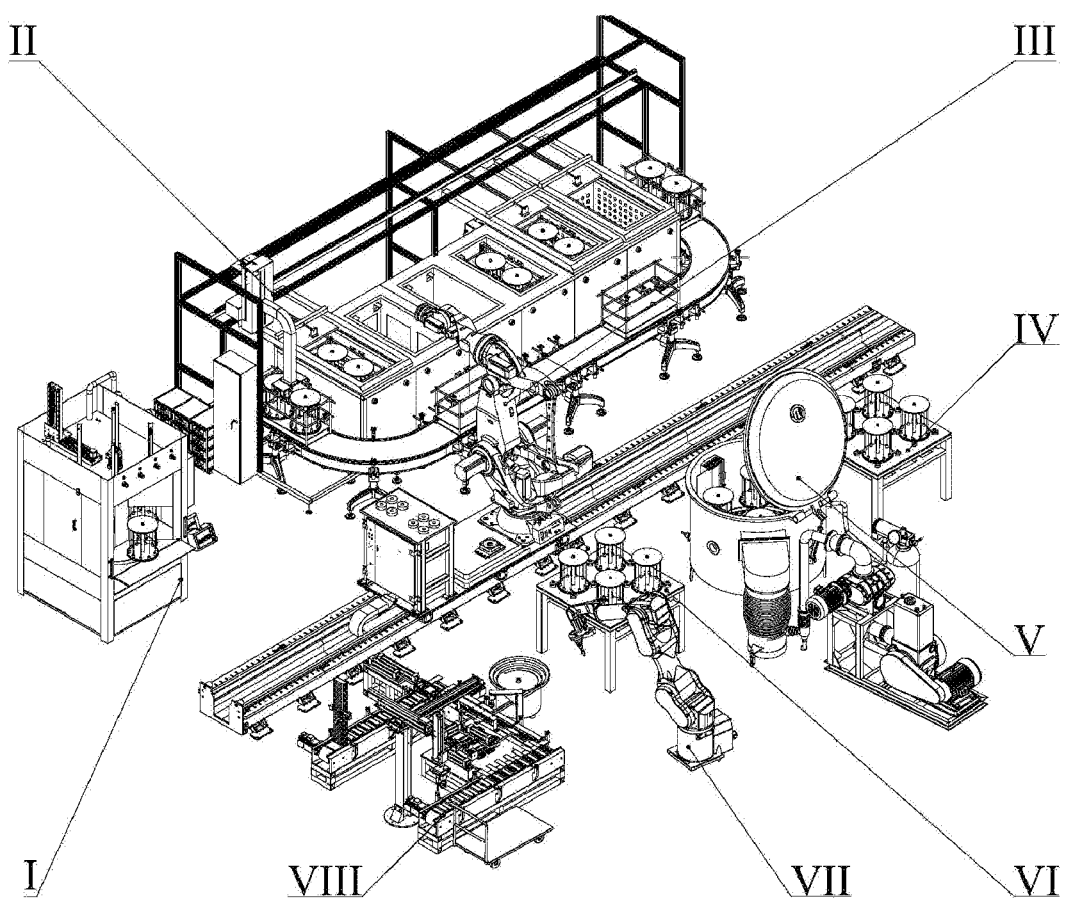
FIG. 1 is an axonometric drawing of a cutter passivation and coating production line according to one or more embodiments of the present disclosure.

I, cutter passivation device; II, blade cleaning and drying device; III, rail-guided robot; IV, blade-coating transfer table; V, blade coating device; VI, blade boxing transfer table; VII, blade-tooling dismounting device; VIII, blade boxing device; I-01, passivation-device shell; I-02, rotating disc mechanism; I-03, spray gun mechanism; I-04, grinding-material backflow mechanism; I-0101, shell support; I-0102, optical grating transducer assembly; I-0103, gas source treatment assembly; I-0104, protective door device; I-0105, electric control cabinet; I-0106, operation panel; I-0107, collecting hopper; I-0201, rotating disc transmission assembly; I-0202, squirrel-cage tooling; I-0203, stepping motor; I-0204, tooling rotating assembly; I-0205, large rotating disc;

I-020201, lower tray; I-020202, blade loading rod; I-020203, upper top tray; I-020204, nut; I-020205, lower top tray; I-020206, small rotating disc shaft; I-020207, upper tray; I-020208, inner hexagon screw; I-020401, belt wheel; I-020402, flat key; I-020403, angular contact ball bearing; I-020404, end cover; I-020405, belt pulley shaft; I-020406, bearing sleeve; I-020407, lock ring at the end of shaft; I-0301, spray gun assembly; I-0302, spray gun up-and-down moving assembly; I-0303, spray gun front-and-back moving assembly; I-0401, blow-off pipe; I-0402, sand pumping pipe; I-0403, grinding fluid pump; I-0404, cyclone separation device; I-0405, sand discharge pipe device; I-0406, dust removal device; I-0407, overflow pipe; I-0408, filter box;

II-01, ultrasonic generator; II-02, lifting device; II-03, cleaning pool; II-04, cleaning line support; II-05, cleaning line tooling frame; II-06, cleaning line conveying belt; II-07, control cabinet; II-0201, left-and-right moving assembly; II-0202, balance assembly; II-0203, up-and-down moving assembly; II-0204, executing assembly; II-0301, high-pressure flushing pool; II-0302, rinsing assembly; II-0303, drying pool assembly; II-0304, rinsing pool; II-0401, rack; II-0402, lifting-device rolling frame; II-0403, lifting-device balance frame; II-0404, cleaning-pool mounting frame; II-0501, lifting ring; II-0502, hole;

II-030201, triangular plate; II-030202, linear bearing; II-030203, lifting part; II-030204, rinsing cross rod; II-030205, transmission rod; II-030206, up-and-down moving shaft; III-01, rail-guided robot electric cabinet; III-02, industrial robot; III-03, floor rail; IV-01, transfer table support; IV-02, rotating cylinder mounting plate; IV-03, rotating cylinder; IV-04, pneumatic chuck; IV-05, chuck mounting plate; V-01, coating chamber; V-02, planar target device; V-03, rotating disc assembly; V-04, cooler; V-05, gas tank; V-06, vacuum pump; V-07, roots vacuum pump; V-08, diffusion pump; V-09, fin heating pipe; V-0201, planar target motor; V-0202, planar target gear; V-0203, planar target; V-0204, planar target baffle plate; V-0205, cooling pipe; V-0206, arc-initiating device; V-0207, linear module; V-0301, power input assembly; V-0302, planetary gear assembly; V-0303, coupler; V-0304, large rotating disc shaft; V-0305, rotating assembly; V-0306, coating rotating disc; V-0307, planetary gear fixed mount;

VII-01, clamping device; VII-02, tooling-dismounting visual device; VII-03, nut dismounting device; VII-04, tooling-dismounting robot; VII-0101, dismounting chuck; VII-0102, pneumatic clamping jaw; VII-0301, sliding rail mounting plate; VII-0302, sliding block; VII-0303, buffer plate; VII-0304, sliding rail; VII-0305, cylinder mounting lower plate; VII-0306, cylinder mounting upper plate; VII-0307, nut dismounting cylinder; VII-308, electric screwdriver; VII-0309, electric-screwdriver mounting plate; VII-0310, buffer rod; VII-0311, buffer spring; VII-0312, outer hexagon wrench; VIII-01, blade-box cover-opening mechanism; VIII-02, blade boxing mechanism; VIII-03, stacking mechanism; VIII-04, blade-box cover-closing mechanism;

VIII-0101, cover opening and box pushing device; VIII-0102, device with inclined surfaces; VIII-0103, blade-box stock bin; VIII-0104, blade-box inputting and conveying device; VIII-0201, vibrated loading device; VIII-0202, blade-box conveying device; VIII-0203, blade box-entering device; VIII-0204, blade-box pushing device; VIII-0301, stacking-assembly support frame; VIII-0302, X-direction moving device; VIII-0303, Y-direction moving device; VIII-0304, Z-direction moving device; VIII-0305, clamping assembly; VIII-0401, blade-box cover-closing device; VIII-0402, blade-box outputting and conveying device;

VIII-020301, blade-loading groove; VIII-020302, blade-groove connecting plate; VIII-020303, blade detection sensor; VIII-020304, linear module, VIII-020305, linear module support; VIII-020306, double-shaft cylinder;

VIII-020401, double-arm linear module; VIII-020402, cylinder for forward pushing; VIII-020403, pushing-out cylinder; and VIII-020404, support.

Detailed Description of the Embodiments

It should be noted that the following detailed description is exemplary and aims to provide further description for the present disclosure. Except as otherwise noted, all techniques and scientific terms used in the present disclosure have same meanings generally understood by ordinary skill in the art in the present disclosure.

It needs to be noted that the terms used herein just describe the specific mode of execution, but not expect to limit the exemplary modes of execution in the disclosure. It is to be understood that the singular forms "a", "an", and "the" include plural referents unless the context clearly dictates otherwise. Moreover, it should be understood that the terms "contain" and/or "comprise" used in the specification indicate characteristics, steps, operations, devices, assemblies and/or their combination.

For ease of description, the words "upper", "lower", "left" and "right", if appearing in this application, are only meant to be consistent with the upper, lower, left and right directions in the attached figures, and do not limit the structure, just for facilitating the description of the present disclosure and simplifying the description, but not for indicating or hinting that the indicated device or element must be in a specific direction and is constructed and operated in the specific direction, so that the terms cannot be understood as the restriction of the present disclosure. Moreover, the terms such as "first" and "second" are just used for distinguishing the description but cannot be understood to indicate or hint relative importance. "Large" and "small" in this application are relative concepts, and do not limit the size and structure.

Explanation part of terms: the terms "mount", "link", "connect", "fix" and the like in this application are to be understood broadly, for example, the components can be fixedly connected, and also can be detachably connected or integrally connected; the components can be directly connected, also can be indirectly connected through an intermediate, and can be communicated internally; or, for the relation between mutual effects of two components, the specific meaning of the above terms in the present disclosure will be understood by those skilled in the art as appropriate.

Embodiment I

The embodiment provides a multi-procedure integrated automatic production line for hard alloy blades under robot control. As shown in FIG. 1, the automatic production line includes a cutter passivation device I, a blade cleaning and drying device II, a rail-guided robot III, a blade-coating transfer table IV, a blade coating device V, a blade boxing transfer table VI, a blade-tooling dismounting device VII and a blade boxing device VIII. The cutter passivation device I and the blade cleaning and drying device II are sequentially arranged and located on the same side. The blade boxing device VIII, the blade boxing transfer table VI, the blade coating device V and the blade-coating transfer table IV are sequentially arranged and located on the same side, and the rail-guided robot III is located between equipment on the two sides. The blade-tooling dismounting device VII is arranged on one side of the blade boxing transfer table VI.

The blades are sequentially subjected to the several procedures of cutting edge passivation, cleaning and drying, surface coating, and boxing in the cutter passivation device I, the blade cleaning and drying device II, the blade-coating transfer table IV and the blade boxing device VIII. After the blades are passivated in the cutter passivation device I, blade toolings and the blades are conveyed to a loading position of the blade cleaning and drying device II through the rail-guided robot III. After the blades are cleaned and dried in the blade cleaning and drying device II, the blade toolings and the blades are conveyed to the blade-coating transfer table IV through the rail-guided robot III. Four sets of toolings can be temporarily stored on the blade-coating transfer tables IV, and the number of the blade-coating transfer tables IV can be increased according to needs. After the blade coating procedure in the blade coating device V is completed, the blade toolings and the blades in the blade coating device V are conveyed into the blade boxing transfer table VI through the rail-guided robot III. Four sets of toolings can be temporarily stored on the blade boxing transfer table VI, and the number of the blade boxing transfer tables VI can be increased according to actual needs. After the blade coating in the blade coating device V is completed every time, the blade toolings and the blades on the blade-coating transfer table IV are conveyed to the blade coating device V through the rail-guided robot III. The coated blades are on the blade boxing transfer table VI, the blade toolings are dismounted by the blade-tooling dismounting device VII, and then the blades are conveyed into the blade boxing device VIII for final packaging work to package the blades in a box.

Figure 2:
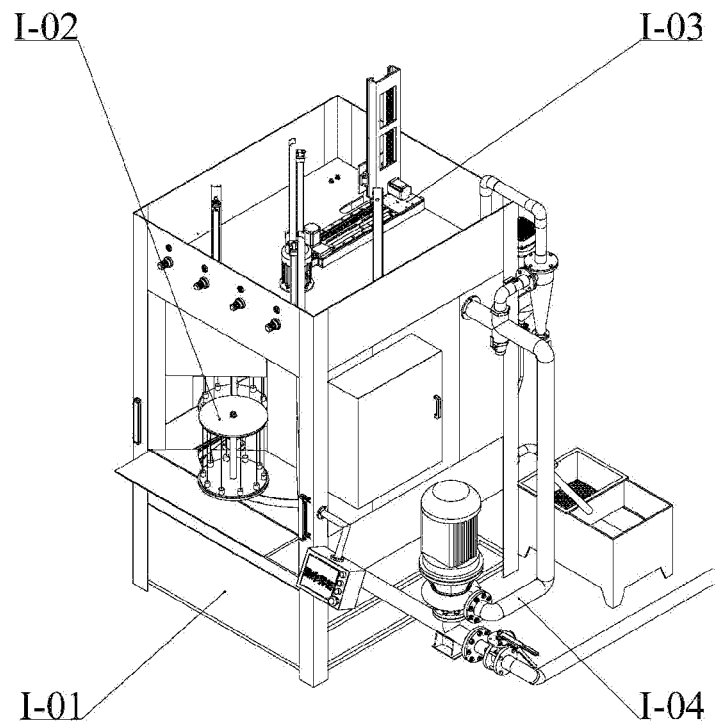
FIG. 2 is an axonometric drawing of a cutter passivation device according to one or more embodiments of the present disclosure.

As shown in FIG. 2, the cutter passivation device I includes a passivation-device shell I-01, a rotating disc mechanism I-02, a spray gun mechanism I-03 and a grinding-material backflow mechanism I-04. The passivation-device shell I-01 mainly plays a role in supporting and protecting, and is used for mounting other parts. The cutter passivation process is mainly completed in the passivation-device shell I-01. The rotating disc mechanism I-02 is mounted in the passivation-device shell I-01 and can drive cutters to rotate during passivating, so that the cutters are uniformly eroded by a grinding material, and the yield of passivating the cutters in batches is guaranteed. A moving assembly of the spray gun mechanism I-03 is mounted above the passivation-device shell I-01, and an executing assembly is mounted in the passivation-device shell I-01. The moving assembly can drive a spray gun to move in the passivation process, so that the coverage range of the sand blasting is enlarged, and the passivation effect of the cutter is improved. The grinding-material backflow mechanism I-04 is partially mounted outside the passivation-device shell I-01, which plays a role in conveying a grinding fluid to the spray gun and purifying air, and further plays a role in replacing the grinding material.

Figure 3:
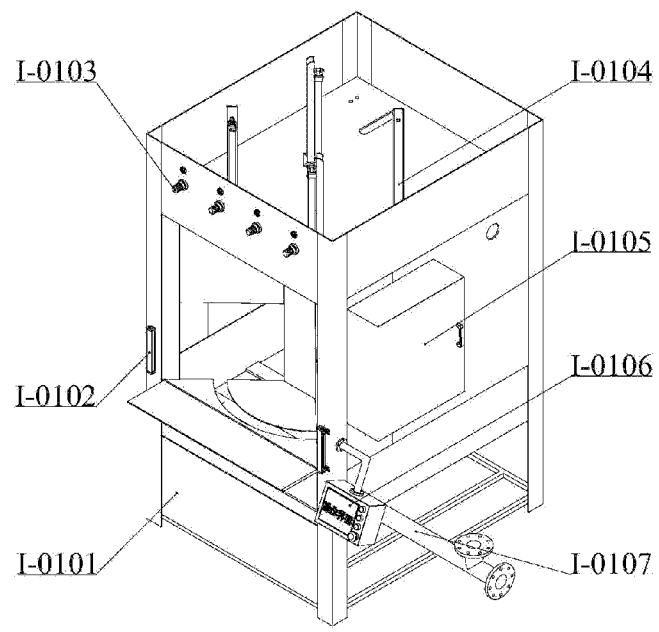
FIG. 3 is an axonometric drawing of a passivation-device shell according to one or more embodiments of the present disclosure.

As shown in FIG. 3, the passivation-device shell I-01 includes a shell support I-0101, optical grating transducer assemblies I-0102, a gas source treatment assembly I-0103, a protective door device I-0104, an electric control cabinet I-0105, an operation panel I-0106 and a collecting hopper I-0107. The shell support I-0101 plays a role in supporting and fixing and is used for mounting other parts. The optical grating transducer assemblies I-0102 are mounted at the loading and unloading positions of the shell support I-0101. When loading and unloading operation is conducted, a light curtain is shielded. At the moment, the rotating disc mechanism I-02 does not rotate, therefore, the work safety is guaranteed. In the embodiment, two optical grating transducer assemblies I-0102 are arranged, and the optical grating transducer assemblies I-0102 are mounted oppositely. The gas source treatment assembly I-0103 is mounted on the side face of the upper portion of the shell support I-0101, and gas treated by the gas source treatment assembly I-0103 can enter other devices. The protective door device I-0104 is an isolation door controlled by a cylinder. The cylinder is mounted at the top of the shell support I-0101, and the isolation door is mounted in the shell support I-0101. So, a sand-blasting operation area in the shell support I-0101 is separated from other areas, which achieves the effect of preventing the grinding fluid from splashing. The electric control cabinet I-0105 is mounted on the side face of the shell support I-0101, and a controller and a main circuit are mounted in the electric control cabinet I-0105. The operation panel I-0106 is mounted on an anterolateral portion of the shell support I-0101 (taking the cutter loading position as the front) and is used for controlling the start and the stop of the machine and the parameter setting during passivation. The collecting hopper I-0107 is mounted at a bottom of the shell support I-0101. The grinding fluid is mainly stored in the collecting hopper I-0107, and the grinding fluid can be conveyed to the spray gun through a pipeline on the side.

Figure 4:
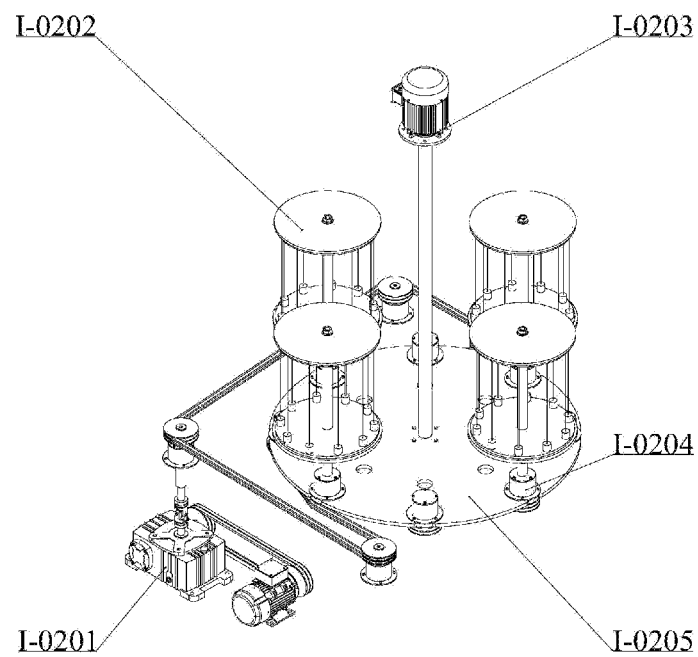
FIG. 4 is an axonometric drawing of a rotating disc mechanism according to one or more embodiments of the present disclosure.

As shown in FIG. 4, the rotating disc mechanism I-02 includes a rotating disc transmission assembly I-0201, a stepping motor I-0203, tooling rotating assemblies I-0204 and a large rotating disc I-0205. The stepping motor I-0203 is connected with the large rotating disc I-0205 and located above the large rotating disc I-0205. The stepping motor can drive the large rotating disc I-0205 to rotate. A plurality of tooling rotating assemblies I-0204 are mounted at the edge portion of the upper surface of the large rotating disc I-0205, and uniformly distributed in manner of taking the motor shaft of the stepping motor I-0203 as the center. The tooling rotating assemblies I-0204 are used for connecting squirrel-cage toolings I-0202. The squirrel-cage toolings I-0202 serve as bearing carriers of the blades, and are conveyed among all devices. The squirrel-cage toolings I-0202 are connected with the rotating disc transmission assembly I-0201 through the tooling rotating assemblies I-0204. The rotating disc transmission assembly I-0201 can transmit power to the squirrel-cage toolings I-0202 through the tooling rotating assemblies I-0204, so that the squirrel-cage toolings I-0202 are driven to rotate. After the passivation of the cutters on one set of squirrel-cage tooling I-0202 is completed, the stepping motor I-0203 rotates by a certain angle to drive the large rotating disc I-0205 to rotate, so as to perform the passivation of the cutters on the next set of squirrel-cage toolings I-0202. The rotating disc transmission assembly I-0201 keeps the continuously rotation in the passivation process, and the cutters rotate along with the squirrel-cage toolings I-0202, so as to guarantee that the cutting edge radius of each blade is within a predetermined range.

Figure 5A:
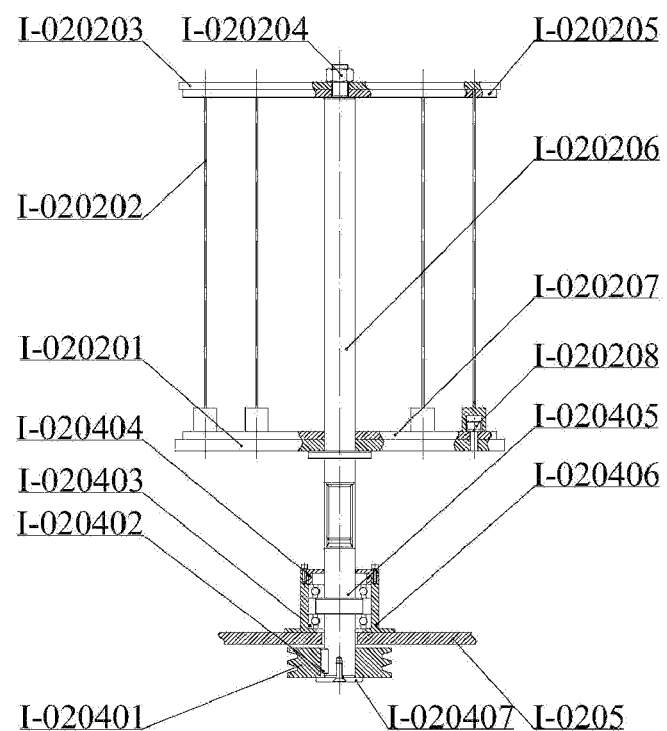
FIG. 5(a) is a section view of a mounting way of squirrel-cage toolings according to one or more embodiments of the present disclosure.
Figure 5B:
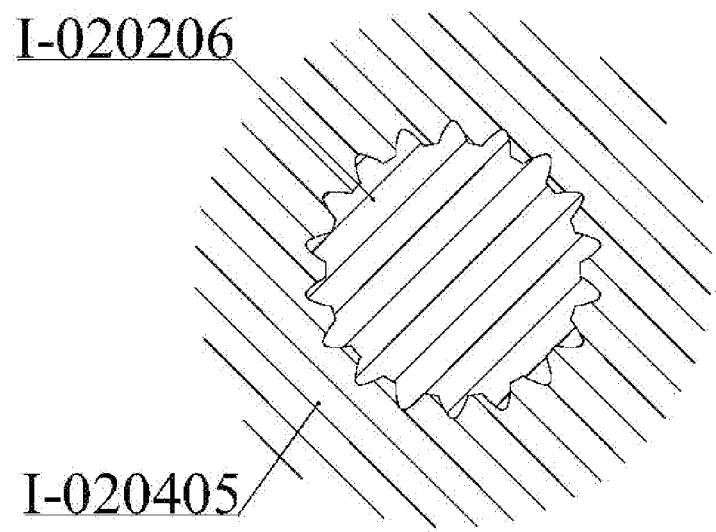
FIG. 5(b) is a section view of a mounting way of squirrel-cage toolings according to one or more embodiments of the present disclosure.

As shown in FIG. 5(a) to FIG. 5(b), the squirrel-cage tooling I-0202 includes a lower tray I-020201, blade loading rods I-020202, an upper top tray I-020203, a nut I-020204, a lower top tray I-020205, a small rotating disc shaft I-020206, an upper tray I-020207 and inner hexagon screws I-020208. Middle portions of all the lower tray I-020201, the upper top tray I-020203, the lower top tray I-020205 and the upper tray I-020207 are formed with each a round hole, and the small rotating disc shaft I-020206 is penetrate through the round hole. One side of the squirrel-cage tooling I-0202 is axially positioned through a shaft shoulder of the small rotating disc shaft I-020206, and the other side of the squirrel-cage tooling I-0202 is positioned through the nut I-020204 and the gravity respectively. The squirrel-cage tooling I-0202 is circumferentially positioned through a key. The inner hexagon screws I-020208 are uniformly mounted on the lower tray I-020201 and the upper tray I-020207 in the circumferential directions thereof. Round holes are formed in the positions, which are corresponding to the inner hexagon screws I-020208, of the lower top tray I-020205. The inner hexagon screw I-020208 is mounted on one side of the blade loading rod I-020202, and the other side of the blade loading rod I-020202 is mounted in the corresponding round hole in the lower top tray I-020205. The blade loading rods I-020202 are mounted into holes of the blades. In order to prevent the contact between the two blades, and to prevent the grinding material from being unable to passivate the contact surfaces of the two blades, a ball with a smaller diameter is inserted between every two blades.

In the embodiment, the rotating disc transmission assembly I-0201 includes a motor and a speed reducer. The motor is connected with the tooling rotating assemblies I-0204 through the speed reducer. Furthermore, the speed reducer is connected with a pulley transmission chain. The diameters of pulleys are equal, and the transmission ratio thereof is 1 in a case where the slipping is neglected. The space arrangement adopted by the pulley can drive the squirrel-cage toolings in the passivation area to rotate around their own axes, whereas the squirrel-cage toolings in the loading and unloading areas cannot rotate. On one hand, the passivating uniformity of the cutters can be ensured; on the other hand, the loading and unloading operations are more convenient. The tooling rotating assembly I-0204 includes a belt pulley I-020401, a flat key I-020402, angular contact ball bearings I-020403, an end cover I-020404, a belt pulley shaft I-020405, a bearing sleeve I-020406 and a lock ring at the end of shaft I-020407. The belt pulley I-020401 is axially positioned through the lock ring at the end of shaft I-020407 and circumferentially positioned through the flat key I-020402. The bearing sleeve I-020406 is fixed to the lock ring at the end of shaft I-020407 through screws. The two angular contact ball bearings I-020403 are oppositely placed in the bearing sleeve I-020406. The end cover I-020404 is fixed to the bearing sleeve I-020406 through screws. An internal spline is arranged on an upper portion of the belt pulley shaft I-020405. An external spline is arranged on a lower portion of the small rotating disc shaft I-020206. So, the belt pulley shaft I-020405 and the small rotating disc shaft I-020206 are in spline fit, namely, the squirrel-cage toolings I-0202 and the tooling rotating assemblies I-0204 are connected and transmitted through splines. In this way, subsequent procedures such as cleaning and coating are facilitated by adopting the structure.

Figure 6:
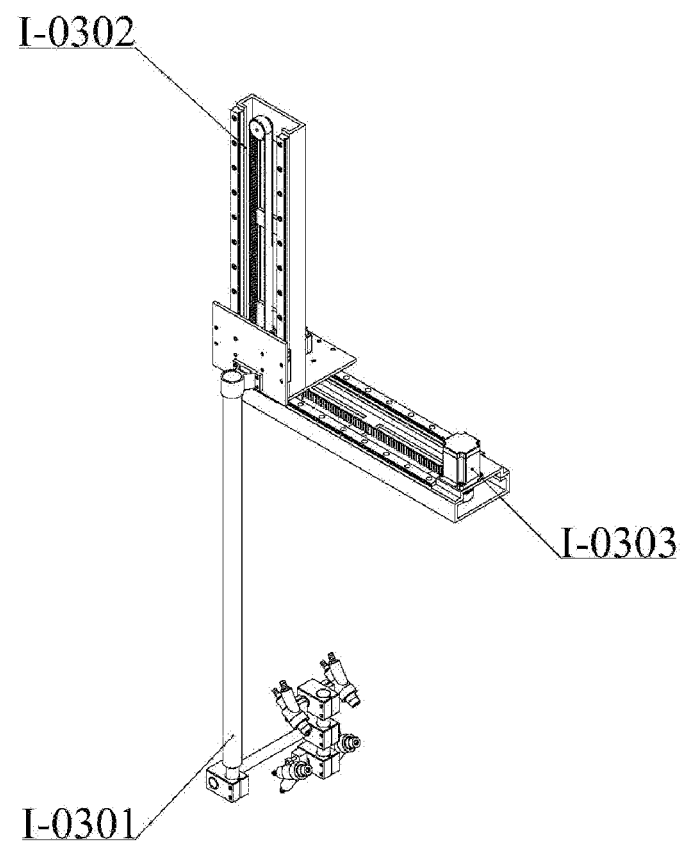
FIG. 6 is an axonometric drawing of a spray gun mechanism according to one or more embodiments of the present disclosure.

As shown in FIG. 6, a spray gun mechanism I-03 includes a spray gun assembly I-0301, a spray gun up-and-down moving assembly I-0302 and a spray gun front-and-back moving assembly I-0303. The spray gun front-and-back moving assembly I-0303 is fixedly mounted at a top of the shell support I-0101. The spray gun up-and-down moving assembly I-0302 and the spray gun front-and-back moving assembly I-0303 are both of a timing belt structure. Two sides of each of the spray gun up-and-down moving assembly I-0302 and the spray gun front-and-back moving assembly I-0303 are provided with sliding blocks and sliding rails. A timing belt of each of the spray gun up-and-down moving assembly I-0302 and the spray gun front-and-back moving assembly I-0303 is fixed with a moving plate that is fixedly connected with the sliding block. When the timing belts rotate, the moving plates and the sliding blocks can be driven to move together. The spray gun up-and-down moving assembly I-0302 is mounted on the moving plate of the spray gun front-and-back moving assembly I-0303, and the spray gun assembly I-0301 is mounted on the moving plate of the spray gun up-and-down moving assembly I-0302. In the cutter passivation process, the spray gun up-and-down moving assembly I-0302 and the spray gun front-and-back moving assembly I-0303 can drive the spray gun assembly I-0301 to move upward and downward, as well as to move forward and backward. Four spray guns placed at a certain angle are arranged at a tail end of the spray gun assembly I-0301. An air inlet and a sand inlet are formed in a tail portion of the spray gun. Grinding fluid is sprayed to surfaces of the cutters at a high speed after being accelerated by gas in the spray guns, so as to play a passivation role.

Figure 7:
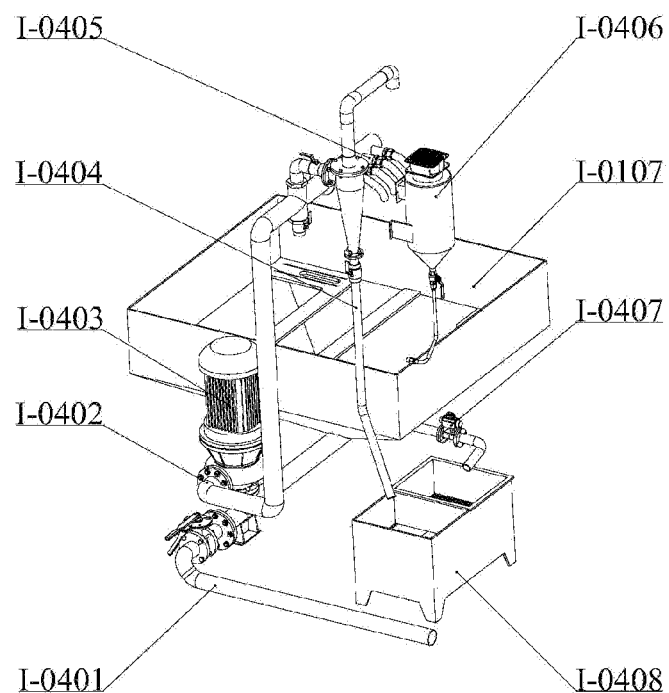
FIG. 7 is an axonometric drawing of a grinding-material backflow mechanism according to one or more embodiments of the present disclosure.

As shown in FIG. 7, the grinding-material backflow mechanism I-04 includes a blow-off pipe I-0401, a sand pumping pipe I-0402, a grinding fluid pump I-0403, a cyclone separation device I-0404, a sand discharge pipe device I-0405, a dust removal device I-0406, an overflow pipe I-0407 and a filter box I-0408. A grinding fluid pipe is extended out of the bottom of the collecting hopper I-0107. Outlet of one side of the grinding fluid pipe is connected with the grinding fluid pump I-0403, and the other side of the grinding fluid pipe is connected with the blow-off pipe I-0401. The blow-off pipe I-0401 is controlled by a butterfly valve, and is in a normally closed state. When all the grinding material in the collecting hopper I-0107 needs to be discharged, the butterfly valve is in an open state. The grinding fluid pump I-0403 can convey the grinding fluid in the collecting hopper I-0107 to the sand discharge pipe device I-0405 through the sand pumping pipe I-0402. The sand discharge pipe device I-0405 includes four outlets connected with the sand inlets of the four spray guns respectively. The grinding fluid enters the spray guns under the action of the grinding fluid pump I-0403. The cyclone separation device I-0404 is connected with the sand pumping pipe I-0402. The dust removal device I-0406 is arranged at the outlet portion of the sand discharge pipe device I-0405, which collects dust particles and the like, discharges treated air, and avoids the environmental pollution. When more dust impurities and the like are contained in the grinding material and the grinding material needs to be replaced, a ball valve that is connected with the cyclone separation device I-0404 is opened. The grinding fluid enters the cyclone separation device I-0404 under the action of the grinding fluid pump I-0403, and is subjected to a separation of sand and water in the cyclone separation device I-0404. Water flows back to the collecting hopper I-0107 from an upper portion of the cyclone separation device I-0404, and the grinding material enters the filter box I-0408 from a lower portion of the cyclone separation device I-0404. The overflow pipe I-0407 is controlled by an electromagnetic valve, and is used for removing oil stains in the grinding fluid. A fan is arranged above the collecting hopper I-0107, so that exhausted air can be purified, and dust is prevented from polluting the environment.

Figure 8:
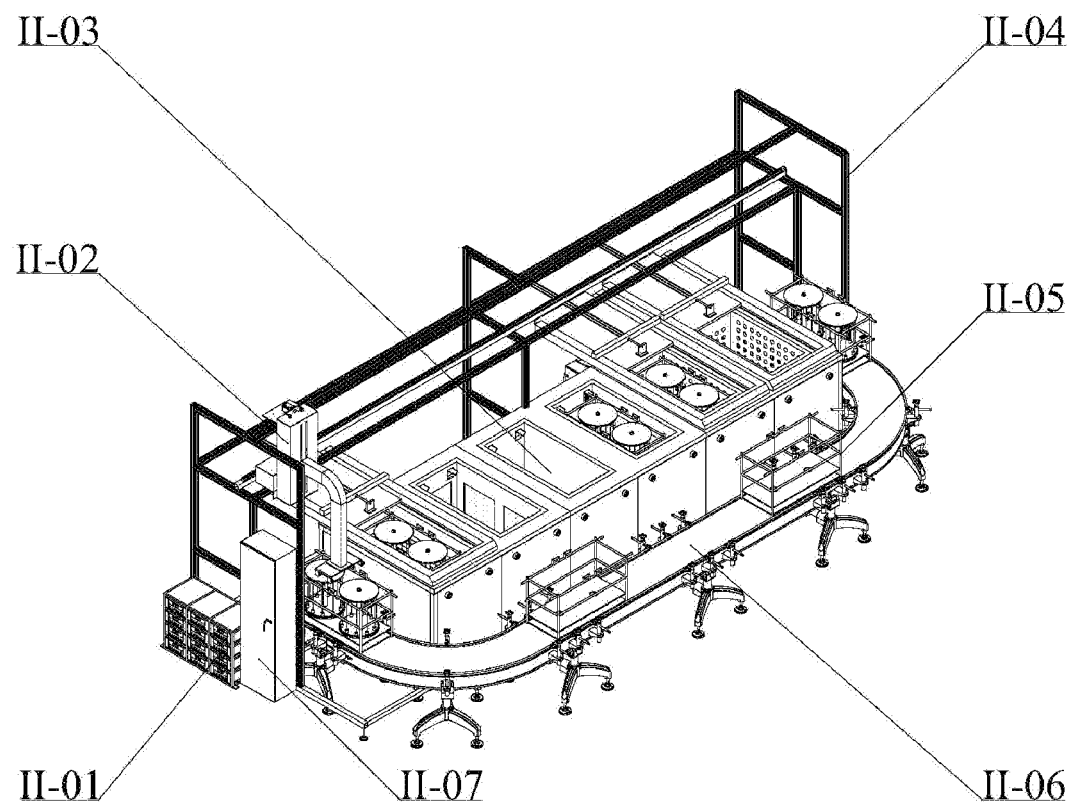
FIG. 8 is an axonometric drawing of a cutter cleaning and drying device according to one or more embodiments of the present disclosure.

As shown in FIG. 8, the blade cleaning and drying device II includes an ultrasonic generator II-01, a lifting device II-02, a cleaning pool II-03, a cleaning line support II-04, cleaning line tooling frames II-05, a cleaning line conveying belt II-06 and a control cabinet II-07. The ultrasonic generator II-01 is used for converting the mains electricity into a high-frequency alternating-current signal matched with an ultrasonic transducer, so as to drive an ultrasonic cleaning pool in the cleaning pool II-03 to work. The lifting device II-02 is mounted on the cleaning line support II-04, and can move left and right on the cleaning line support II-04. The lifting device II-02 is mainly used for lifting the cleaning line tooling frame II-05 from the loading position, then sequentially putting the cleaning line tooling frame II-05 into a cleaning pool and a drying pool in the cleaning pool II-03, and finally moving the cleaning line tooling frames II-05 to the unloading position. The cleaning line conveying belt II-06 is used for conveying the cleaning line tooling frames II-05 after being unloaded back to the loading position for loading.

Figure 9:
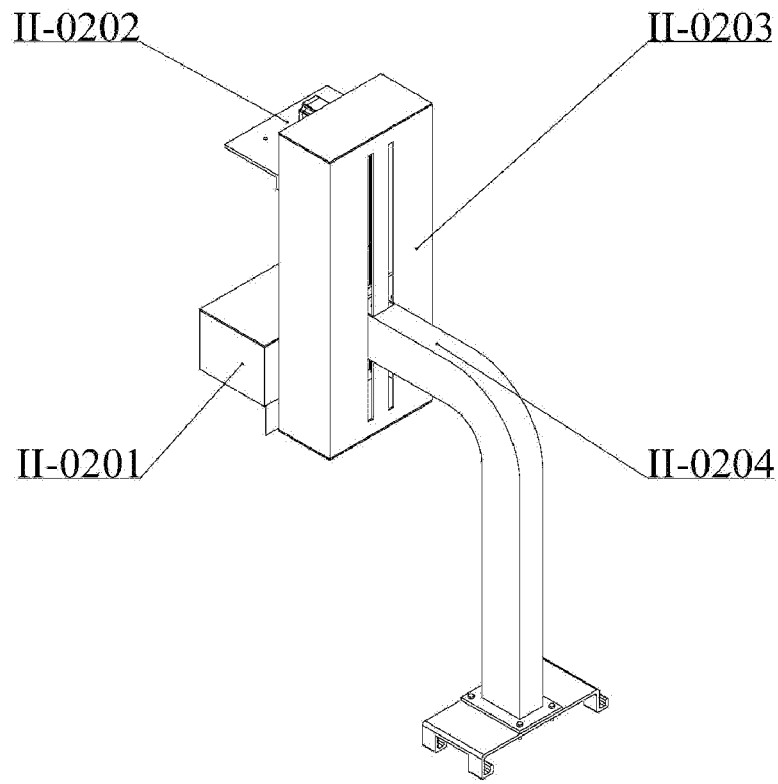
FIG. 9 is an axonometric drawing of a lifting device according to one or more embodiments of the present disclosure.

As shown in FIG. 9, the lifting device II-02 includes a left-and-right moving assembly II-0201, a balance assembly II-0202, an up-and-down moving assembly II-0203 and an executing assembly II-0204. The left-and-right moving assembly II-0201 and the balance assembly II-0202 are mounted behind the up-and-down moving assembly II-0203, and two devices (i.e., the left-and-right moving assembly and the balance assembly) are provided with rollers which can slide along a cross beam of the cleaning line support II-04. A gear controlled by a motor is further mounted in the left-and-right moving assembly II-0201. The gear is matched with a rack on the cleaning line support II-04 to provide power for the movement of the lifting device II-02. A transmission structure for the timing belts is arranged in the up-and-down moving assembly II-0203. Moving plates are fixed to the timing belts and fixedly connected with the executing assembly II-0204. When the timing belts in the up-and-down moving assembly II-0203 rotate, the executing assembly II-0204 can be driven to move up and down, so that the lifting of the cleaning line tooling frames II-05 is achieved.

Figure 10:
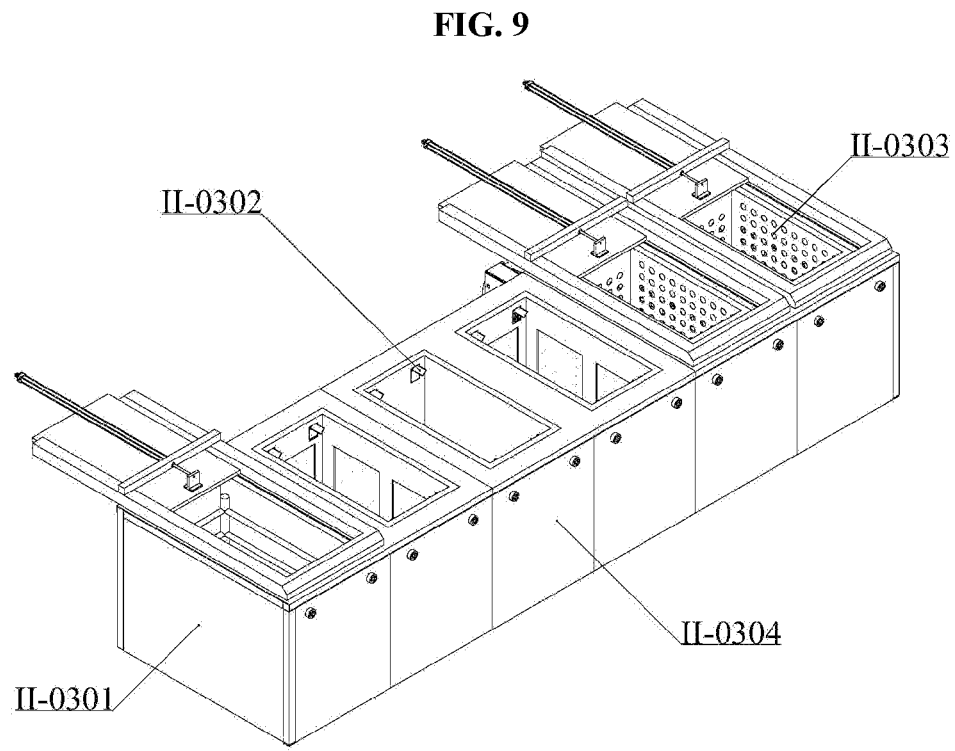
FIG. 10 is an axonometric drawing of a cleaning pool according to one or more embodiments of the present disclosure.

As shown in FIG. 10, the cleaning pool II-03 includes high-pressure flushing pools II-0301, drying pool assemblies II-0303 and rinsing pools II-0304 which are sequentially arranged. The left-and-right moving assembly II-0201 is located on one side of each of the high-pressure flushing pools II-0301, so that high-pressure flushing for the cutters can be achieved, and impurities on the cutters are primarily flushed away. The drying pool assemblies II-0303 are used for drying water on the surfaces of the cutters. A circulating air heater is used in the drying pool assemblies II-0303, so that the drying efficiency is improved, and the energy is saved. The rinsing pools II-0304 may achieve the ultrasonic cleaning, the clean water rinsing and the ultrasonic rinsing for the cutters respectively. A rinsing assembly for controlling the cutters to move up and down is further arranged in the rinsing pools II-0304, so as to improve the rinsing effect.

Figure 11:
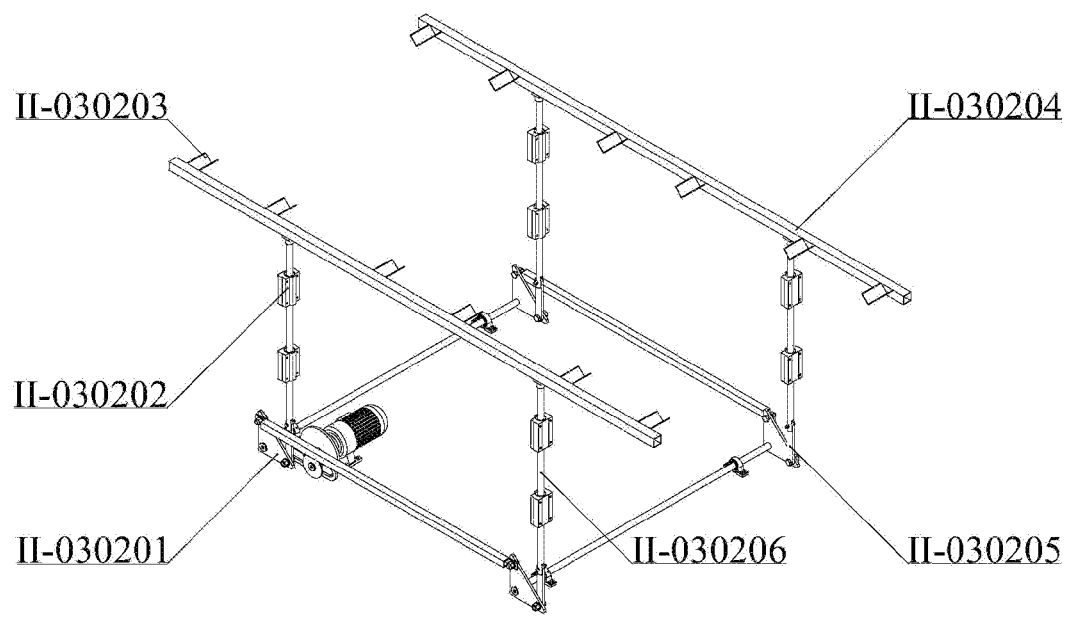
FIG. 11 is a schematic structural diagram of a rinsing assembly according to one or more embodiments of the present disclosure.

Further, a high-pressure flushing chamber is arranged in the high-pressure flushing pool II-0301. High-pressure flushing pipes are mounted on side walls of the high-pressure flushing chamber, and the high-pressure flushing pipes are used for the inflow of high-pressure water. A flushing pool top cover is mounted at a top of the high-pressure flushing pool II-0301 and connected with a flushing pool cylinder. The flushing pool top covers are controlled to be opened or closed through the flushing pool cylinders. The rinsing pools II-0304 includes an ultrasonic cleaning pool, a clean water rinsing pool and an ultrasonic rinsing pool which are sequentially arranged. A rinsing assembly is arranged below the clean water rinsing pool. The rinsing effect is improved through the rinsing assemblies. A plurality of ultrasonic resonators are mounted on the side face of the ultrasonic cleaning pool. As shown in FIG. 11, the rinsing assembly includes rinsing cross rods II-030204. A plurality of lifting parts II-030203 are fixed to the rinsing cross rod II-030204. The two ends of the rinsing cross rod II-030204 are connected with up-and-down moving shafts II-030206. The up-and-down moving shafts II-030206 are slidably connected with relatively immoveable linear bearings II-030202. The bottom end of the up-and-down moving shaft II-030206 is hinged to one end of a transmission rod II-030205, and the other end of the transmission rod II-030205 is hinged to one end of a triangular plate II-030201. The triangular plate II-030201 can rotate within a set angle range.

Figure 12:
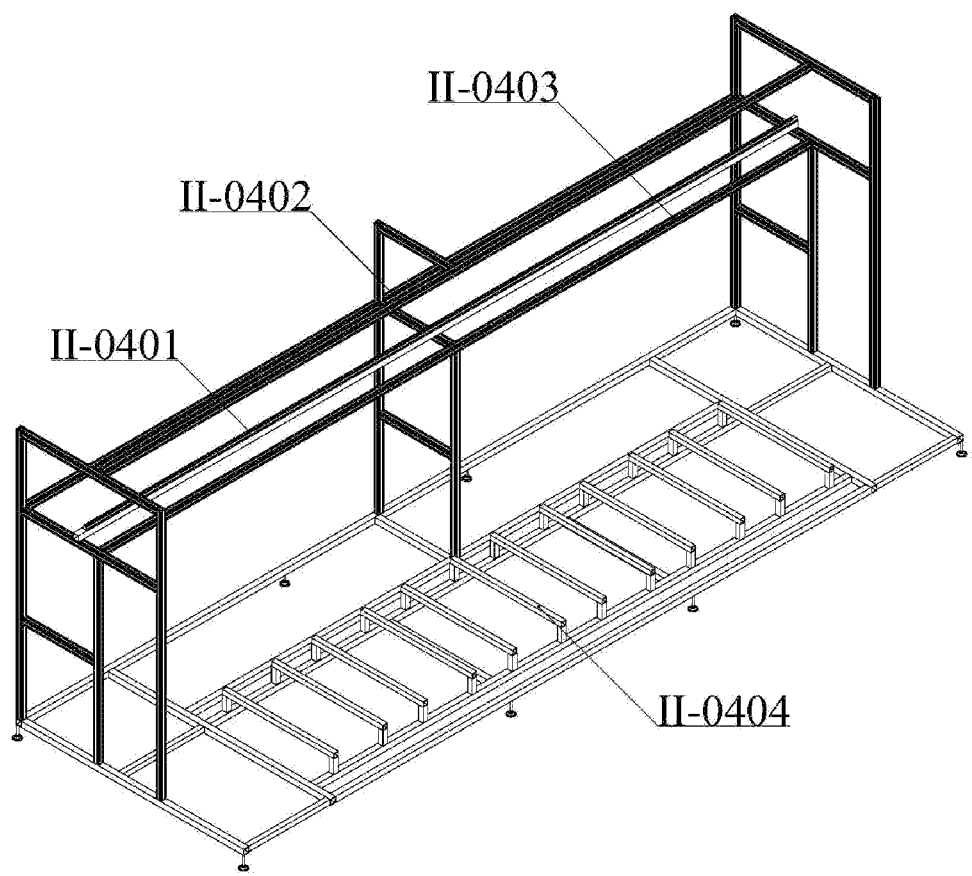
FIG. 12 is an axonometric drawing of a cleaning line support according to one or more embodiments of the present disclosure.

As shown in FIG. 12, the cleaning line support II-04 includes a rack II-0401, a lifting-device rolling frame II-0402, a lifting-device balance frame II-0403 and a cleaning-pool mounting frame II-0404. The cleaning-pool mounting frame II-0404 is used for supporting the cleaning pool II-03, and is horizontally arranged. The rack II-0401, the lifting-device rolling frame II-0402 and the lifting-device balance frame II-0403 are parallel to one another, and all located above the cleaning-pool mounting frame II-0404. The rack II-0401 is matched with a gear of the left-and-right moving assembly II-0201. The lifting-device rolling frame II-0402 is used for limiting the positions of rollers in the balance assembly II-0202. The lifting-device balance frame II-0403 is used for limiting the positions of rollers of the left-and-right moving assembly II-0201.

Figure 13:
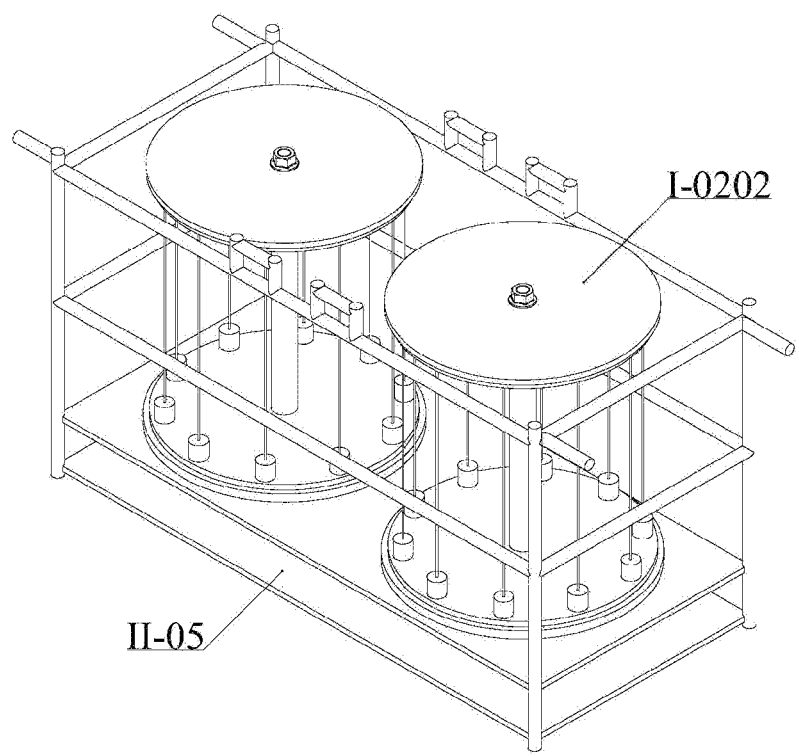
FIG. 13 is an axonometric drawing of a cleaning line tooling according to one or more embodiments of the present disclosure.
Figure 14:
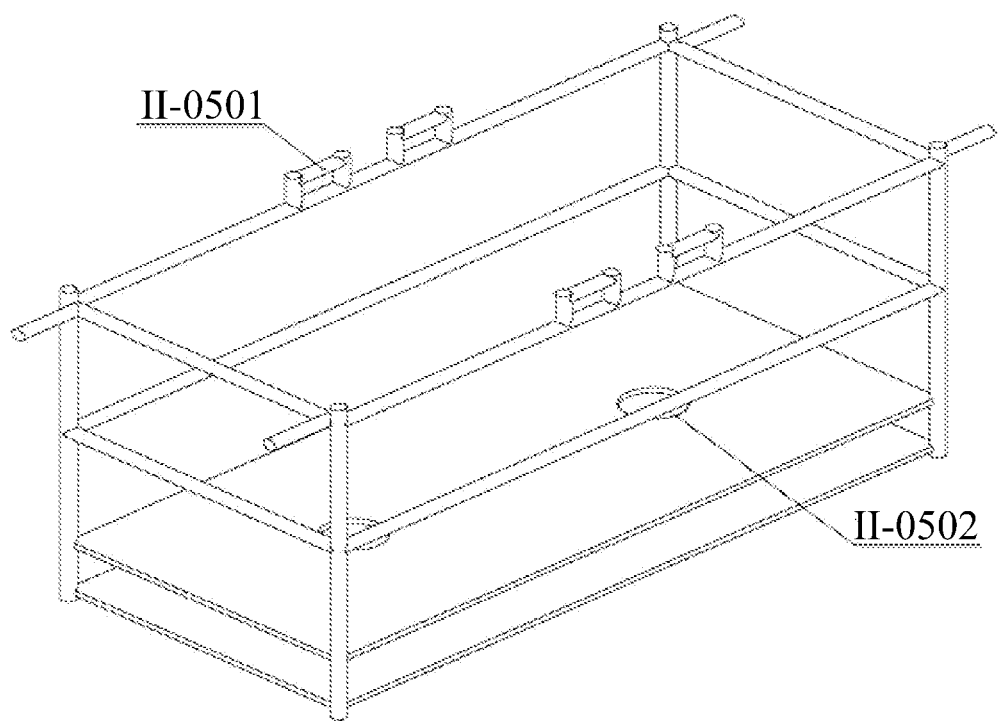
FIG. 14 is an axonometric drawing of a cleaning line tooling frame according to one or more embodiments of the present disclosure.

The cleaning line conveying belt II-06 is located outside the cleaning pool II-03, and used for transferring the squirrel-cage toolings I-0202. The cleaning line tooling frames II-05 are arranged on the cleaning line conveying belt II-06, and are carriers for transporting the squirrel-cage toolings I-0202. As shown in FIG. 13 and FIG. 14, the squirrel-cage toolings I-0202 are placed in the cleaning line tooling frames II-05, and each cleaning line tooling frame II-05 can place a plurality of squirrel-cage toolings I-0202. In the embodiment, two holes II-0502 are formed in a bottom of the cleaning line tooling frame II-05, and a shaft protruding from a bottom of the squirrel-cage tooling I-0202 can pass through the hole II-0502, so that the squirrel-cage tooling I-0202 can be stably placed on the cleaning line tooling frame II-05. The cleaning line tooling frame II-05 is of a frame structure, and a plurality of lifting rings II-0501 are symmetrically mounted on two sides of the cleaning line tooling frame II-05. Lifting hooks of the lifting device II-02 can lift the cleaning line tooling frame II-05 through the lifting rings II-0501.

Figure 15:
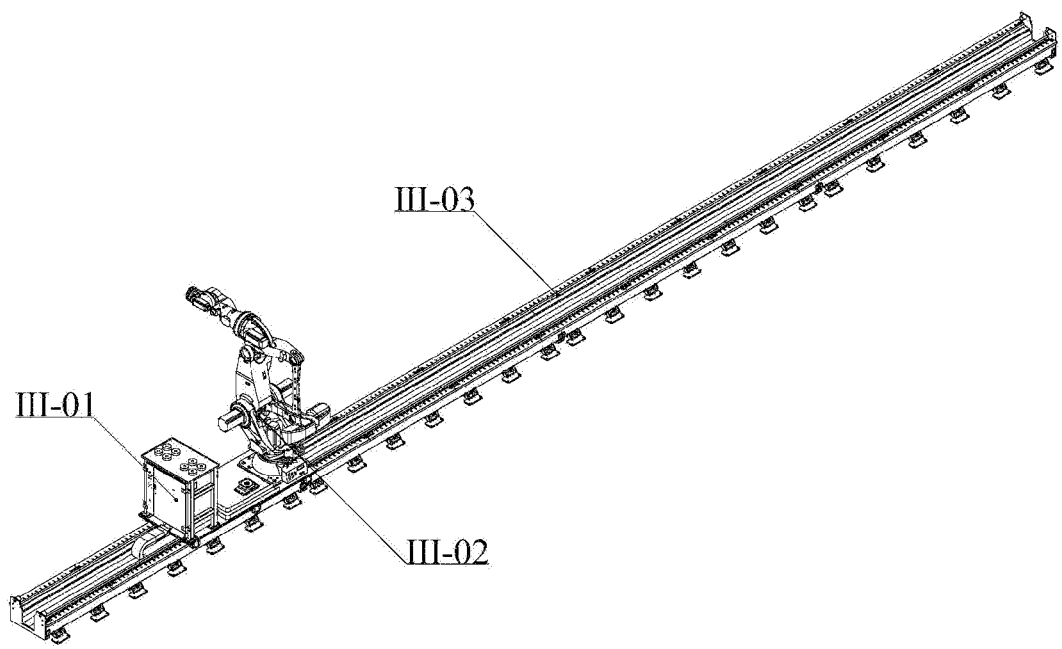
FIG. 15 is an axonometric drawing of a rail-guided robot according to one or more embodiments of the present disclosure.

As shown in FIG. 15, the rail-guided robot III includes a rail-guided robot electric cabinet III-01, an industrial robot III-02 and a floor rail III-03. The rail-guided robot electric cabinet III-01 and the industrial robot III-02 are mounted on a sliding table. The floor rail III-03 is fixed to the ground through foundation bolts. The sliding table can slide along the floor rail III-03 to convey the industrial robot III-02 to a designated position. A length of the floor rail of the rail-guided robot III is a distance from the cutter passivation device to the blade cleaning and drying device, so that the robot can move among all the devices, and the loading and unloading functions are realized. The rail-guided robot electric cabinet III-01 is used for receiving signals and sending instructions.

Figure 16:
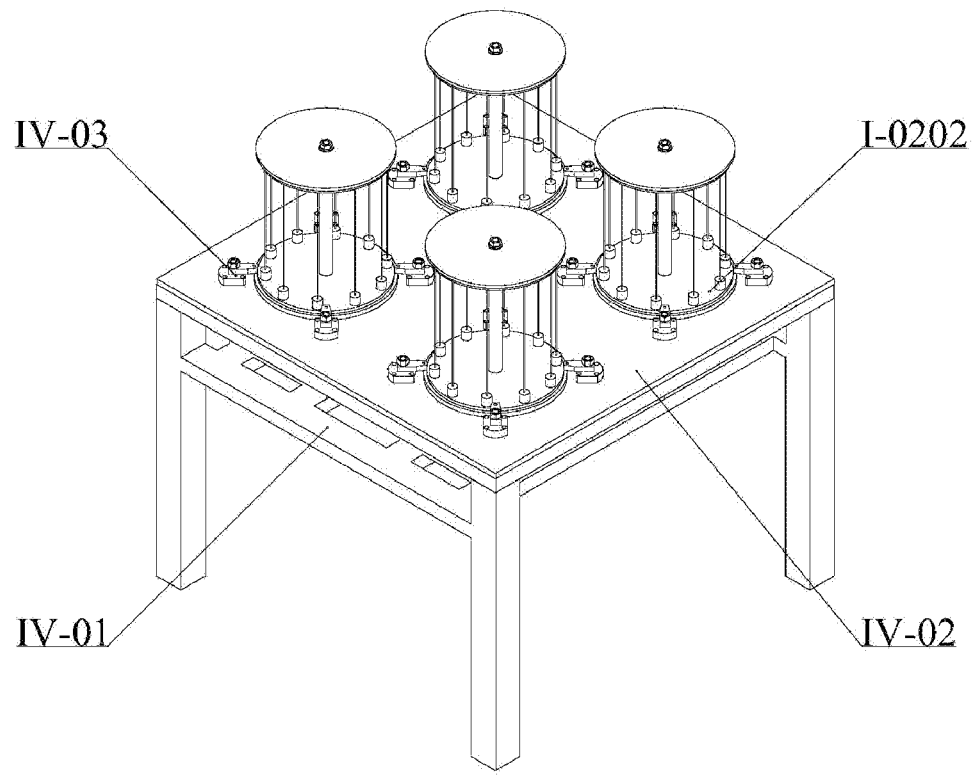
FIG. 16 is an axonometric drawing of a blade-coating transfer table according to one or more embodiments of the present disclosure.
Figure 17:
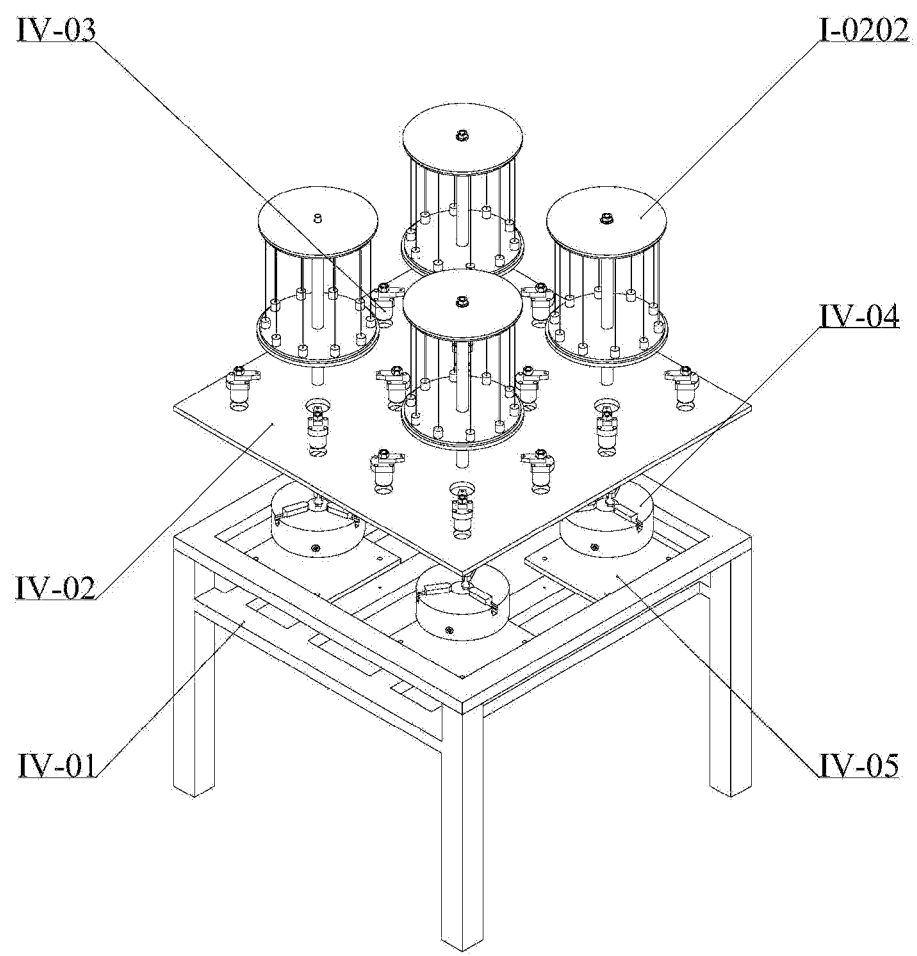
FIG. 17 is an exploded view of the blade-coating transfer table according to one or more embodiments of the present disclosure.

As shown in FIG. 16 and FIG. 17, the blade-coating transfer table IV includes a transfer table support IV-01, a rotating cylinder mounting plate IV-02, rotating cylinders IV-03, pneumatic chucks IV-04 and chuck mounting plates IV-05. The transfer table support IV-01 is divided into an upper layer and a lower layer. The rotating cylinder mounting plate IV-02 is mounted on the upper layer, and a plurality of chuck mounting plates IV-05 are mounted on the lower layer. In the embodiment, there are four chuck mounting plates IV-05. A plurality of larger holes are formed in the rotating cylinder mounting plate IV-02 and used for placing the squirrel-cage toolings I-0202. A plurality of smaller holes are formed around each larger hole, and used for mounting the rotating cylinders IV-03. The pneumatic chucks IV-04 are mounted on the chuck mounting plates IV-05 in manner of directly opposite to the larger hole of rotating cylinder mounting plate IV-02. When the squirrel-cage toolings I-0202 are placed on the blade-coating transfer table IV, shafts at the bottom portions of the squirrel-cage toolings I-0202 penetrate through the larger holes in the rotating cylinder mounting plate IV-02. The rotating cylinders IV-03 act to press tightly the squirrel-cage toolings I-0202, and the pneumatic chucks IV-04 act to clamp tightly the squirrel-cage toolings I-0202.

Figure 18:
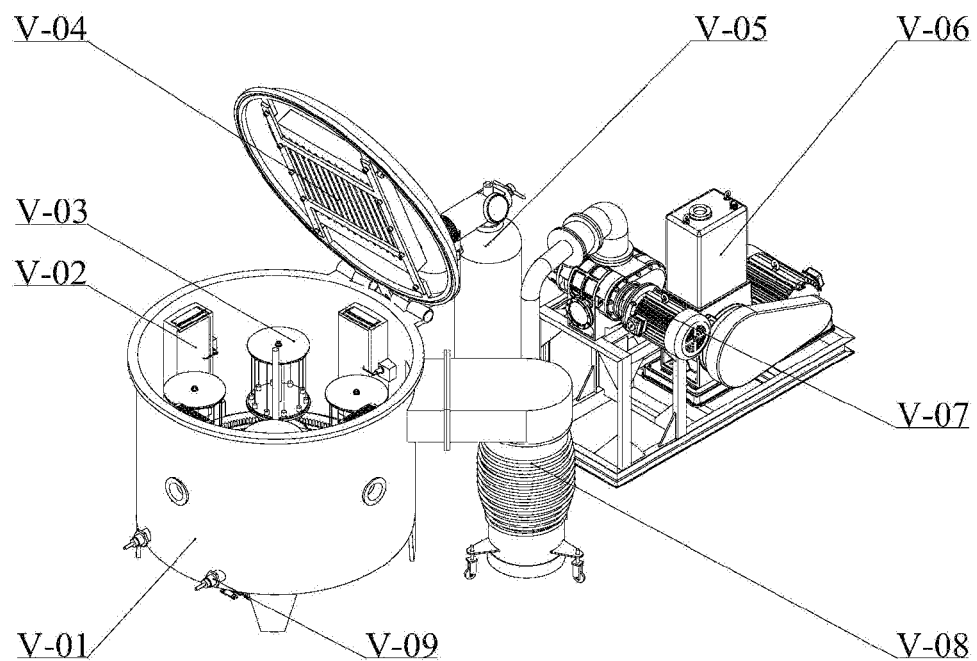
FIG. 18 is an axonometric drawing of a blade coating device according to one or more embodiments of the present disclosure.

As shown in FIG. 18, the blade coating device V includes a coating chamber V-01, planar target devices V-02, rotating disc assemblies V-03, a cooler V-04, a gas tank V-05, a vacuum pump V-06, a roots vacuum pump V-07, a diffusion pump V-08 and fin heating pipes V-09. The cutters are subjected to a coating procedure in the coating chamber V-01. A plurality of planar target devices V-02 are mounted on inner walls of the coating chamber V-01, and the number of the planar target devices V-02 is the same as that of the squirrel-cage toolings I-0202 accommodated in the coating chamber V-01. Target particles on the planar target devices V-02 are attached closely to the surfaces of the cutters through bombardment. The rotating disc assemblies V-03 are mounted at a central position in the coating chamber V-01, and the cutters can move along with planetary gears during coating, so that the coatings of the cutters are uniform. The cooler V-04 is mounted at a top of the coating chamber V-01, and used for reducing a temperature in the coating chamber V-01 after the coating procedure is completed. The gas tank V-05 is communicated with an interior of the coating chamber V-01, and is used for introducing elements in gas state, which are required by the coating, into the coating chamber V-01. The vacuum pump V-06, the roots vacuum pump V-07 and the diffusion pump V-08 are connected in series. The diffusion pump V-08 is connected with the coating chamber V-01. The vacuum pump V-06, the roots vacuum pump V-07 and the diffusion pump V-08 are sequentially started before coating, and the interior of the coating chamber V-01 is vacuumized. The fin heating pipes V-09 are mounted on a side face of the coating chamber V-01, and used for heating the coating chamber V-01, so as to adapt to the coating work.

Figure 19:
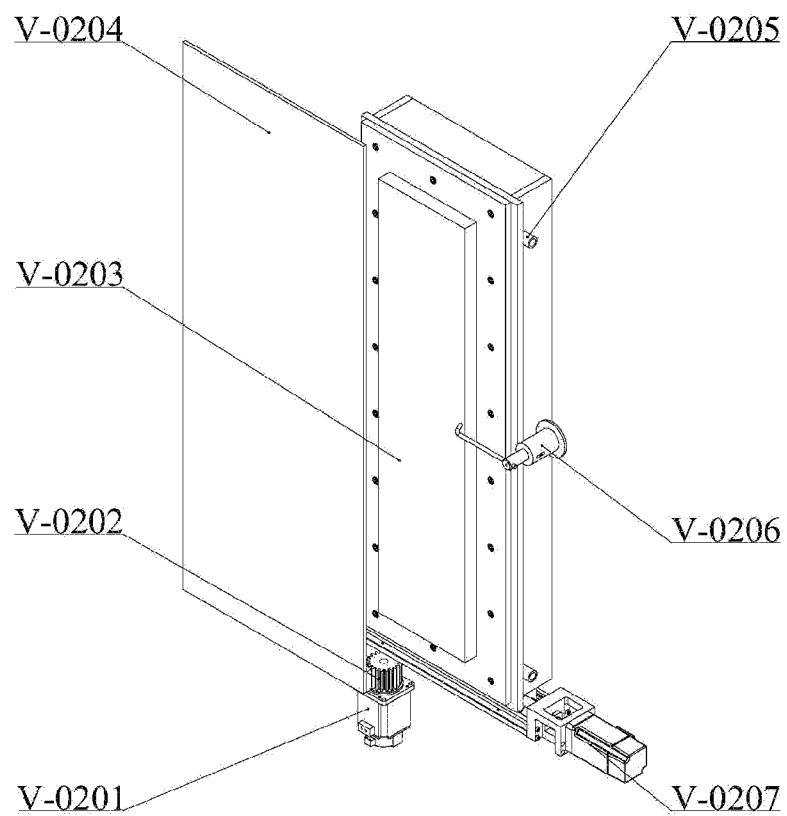
FIG. 19 is an axonometric drawing of a planar target device according to one or more embodiments of the present disclosure.

As shown in FIG. 19, the planar target device V-02 includes a planar target motor V-0201, a planar target gear V-0202, a planar target V-0203, a planar target baffle plate V-0204, cooling pipes V-0205, an arc-initiating device V-0206 and a linear module V-0207. The planar target motor V-0201 is connected with the planar target gear V-0202 and can drive the planar target gear V-0202 to rotate. A rack is mounted at a bottom of the planar target baffle plate V-0204 and meshed with the planar target gear V-0202. When the planar target motor V-0201 rotates, the planar target baffle plate V-0204 can be controlled to be opened or closed. The arc-initiating device V-0206 is arranged on one side of the planar target V-0203 and can lead an electric arc to the planar target V-0203, so that particles on the planar target V-0203 overflow and bombard the surfaces of the cutters at a high speed. High temperature is generated when the electric arc acts on the planar target V-0203. The cooling pipes V-0205 are fixed on a back face of the planar target V-0203 and can be used for cooling. The linear module V-0207 is located below the planar target V-0203, and the linear module V-0207 and the planar target V-0203 are slidably connected. The linear module V-0207 can drive a magnetic rod behind the planar target V-0203 to horizontally move, and the particle bombardment position is changed through the magnetic field orientation, thereby improving the target utilization rate.

Figure 20:
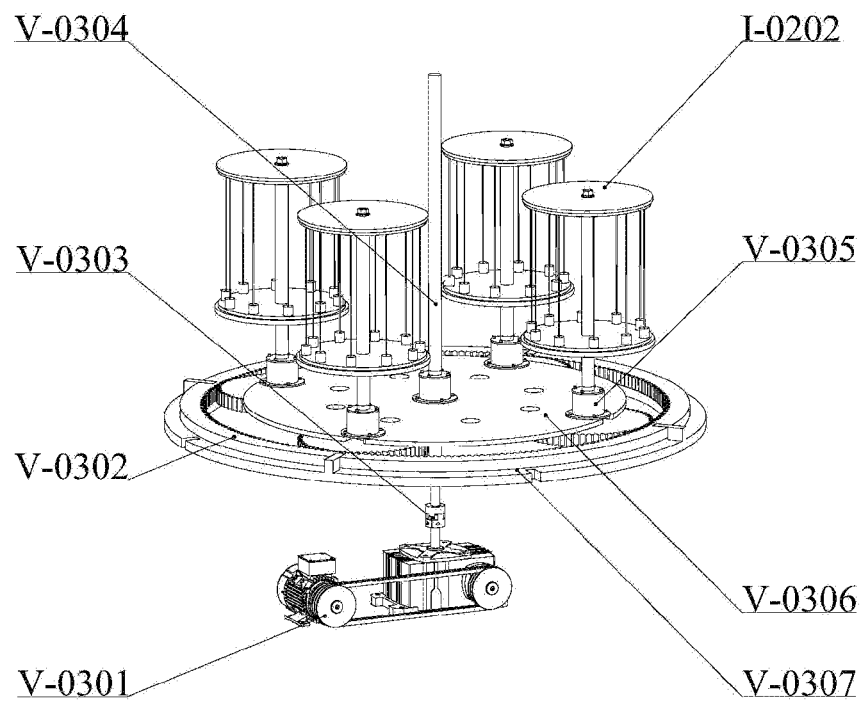
FIG. 20 is an axonometric drawing of a rotating disc assembly according to one or more embodiments of the present disclosure.

As shown in FIG. 20, the rotating disc assembly V-03 includes a power input assembly V-0301, a planetary gear assembly V-0302, a coupler V-0303, a large rotating disc shaft V-0304, rotating assemblies V-0305, a coating rotating disc V-0306 and a planetary gear fixed mount V-0307. The power input assembly V-0301 provides power, and torque is transmitted to the large rotating disc shaft V-0304 through the coupler V-0303. The large rotating disc shaft V-0304 is fixedly connected with the coating rotating disc V-0306, and a lower part of the large rotating disc shaft V-0304 is connected with a sun gear of the planetary gear assembly V-0302 through the flat key. The rotating assembly V-0305 is fixed on the coating rotating disc V-0306. An upper part of the rotating assembly V-0305 is connected with the squirrel-cage tooling I-0202 through the spline, and a lower part of the rotating assembly V-0305 is connected with a planetary gear of the planetary gear assembly V-0302 through the flat key. An inner gear ring of the planetary gear assembly V-0302 and the planetary gear fixed mount V-0307 are positioned through a positioning block. When the power input assembly V-0301 rotates, the squirrel-cage toolings I-0202 are driven to do planetary gear motion, so that the coating is uniform.

Figure 21:
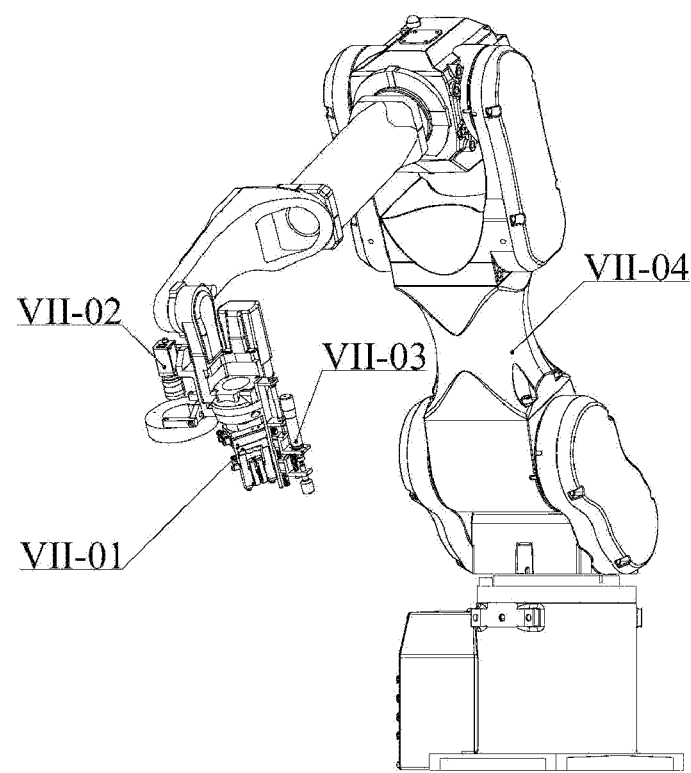
FIG. 21 is an axonometric drawing of a blade-tooling dismounting device according to one or more embodiments of the present disclosure.

The structure of the blade boxing transfer table VI is the same as that of the blade-coating transfer table IV, and unnecessary details are not given herein. As shown in FIG. 21, the blade-tooling dismounting device VII includes a clamping device VII-01, a tooling-dismounting visual device VII-02, a nut dismounting device VII-03 and a tooling-dismounting robot VII-04. The clamping device VII-01, the tooling-dismounting visual device VII-02 and the nut dismounting device VII-03 are mounted at a tail end of the tooling-dismounting robot VII-04. The tooling-dismounting visual device VII-02 is used for detecting positions of blade toolings. The nut dismounting device VII-03 is used for dismounting inner hexagon screws I-020208 at a top of the squirrel-cage tooling I-0202. The clamping device VII-01 is used for dismounting the upper tray I-020207 and the lower tray I-020201 of the squirrel-cage tooling I-0202. The blades are conveyed to the blade boxing device VIII, and the squirrel-cage toolings I-0202 are conveyed to a special recycling place.

Figure 22:
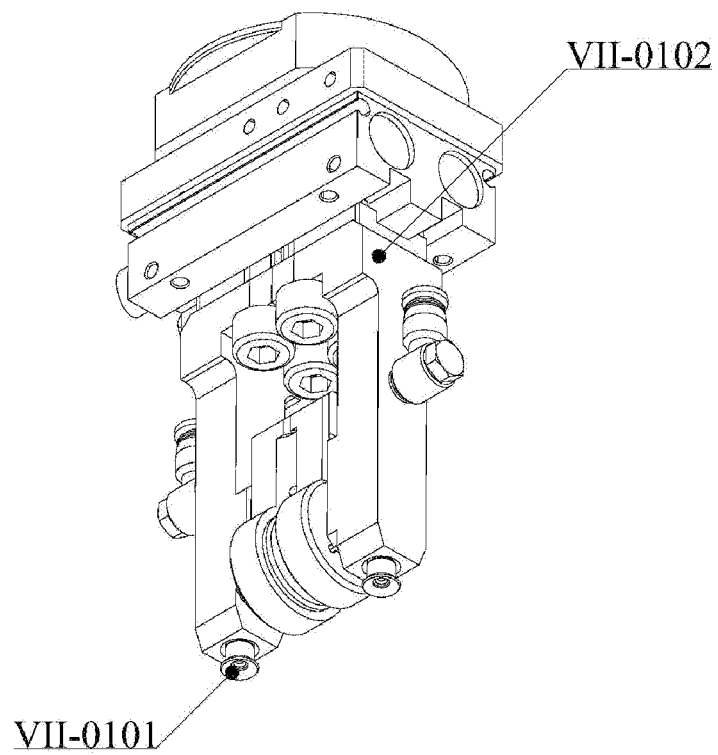
FIG. 22 is an axonometric drawing of a clamping device according to one or more embodiments of the present disclosure.

As shown in FIG. 22, the clamping device VII-01 includes dismounting chucks VII-0101 and a pneumatic clamping jaw VII-0102. The dismounting chuck VII-0101 is fixed a bottom of the pneumatic clamping jaw VII-0102. The dismounting chucks VII-0101 can dismount the upper tray I-020207 and the lower tray I-020201 through negative pressure suction. The pneumatic clamping jaw VII-0102 can clamp the small rotating disc shaft I-020206 with the blades strung thereon, and convey the blades to the blade boxing device VIII.

Figure 23:
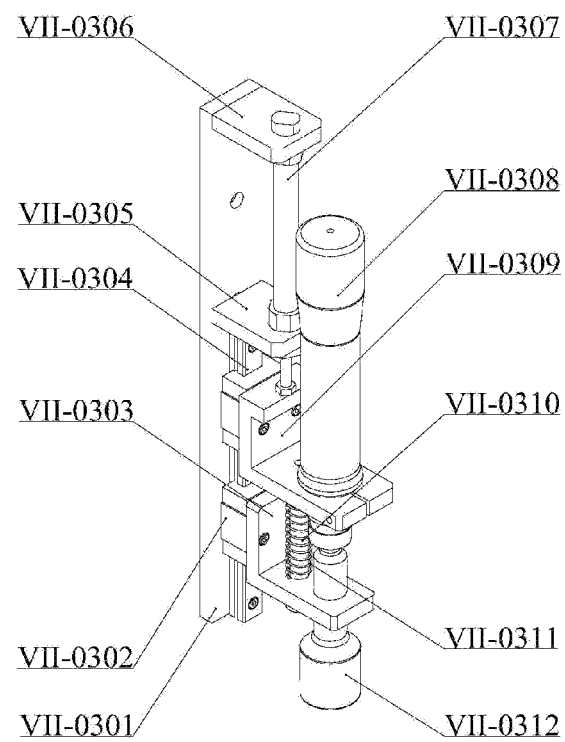
FIG. 23 is an axonometric drawing of a nut dismounting device according to one or more embodiments of the present disclosure.
Figure 24:
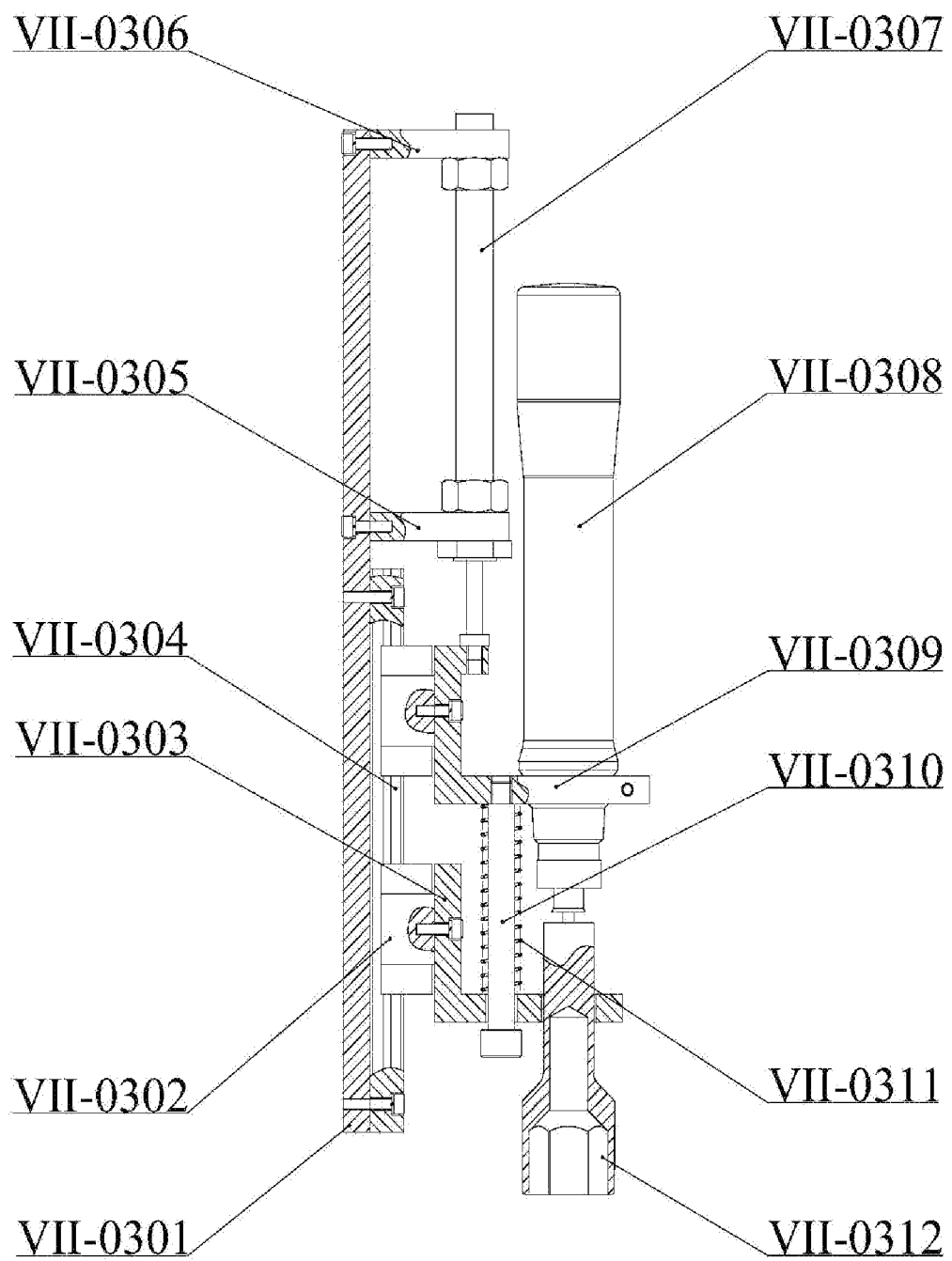
FIG. 24 is a section view of the nut dismounting device according to one or more embodiments of the present disclosure.

As shown in FIG. 23 and FIG. 24, the nut dismounting device VII-03 includes a sliding rail mounting plate VII-0301, sliding blocks VII-0302, a buffer plate VII-0303, a sliding rail VII-0304, a cylinder mounting lower plate VII-0305, a cylinder mounting upper plate VII-0306, a nut dismounting cylinder VII-0307, an electric screwdriver VII-0308, an electric screwdriver mounting plate VII-0309, a buffer rod VII-0310, a buffer spring VII-0311 and an outer hexagon wrench VII-0312. The sliding rail mounting plate VII-0301 is mounted at the tail end of the tooling-dismounting robot VII-04 through screws. The sliding rail VII-0304, the cylinder mounting lower plate VII-0305 and the cylinder mounting upper plate VII-0306 are all fixed to the sliding rail mounting plate VII-0301 through screws. One end of the nut dismounting cylinder VII-0307 is fixed on the cylinder mounting upper plate VII-0306, and the other end of the nut dismounting cylinder VII-0307 is fixed on the cylinder mounting lower plate VII-0305. A front end of a piston rod of the nut dismounting cylinder VII-0307 is fixedly connected with the electric screwdriver mounting plate VII-0309. The electric screwdriver mounting plate VII-0309 is fixedly connected with the sliding block VII-0302 on the electric screwdriver mounting plate VII-0309 through screws. The sliding block VII-0302 that is below the electric screwdriver mounting plate VII-0309 is fixedly connected with the buffer plate VII-0303. The sliding blocks VII-0302 can slide on the sliding rail VII-0304. The electric screwdriver VII-0308 is fixed on the electric screwdriver mounting plate VII-0309, and the lower part of the electric screwdriver VII-0308 is connected with the outer hexagon wrench VII-0312. The buffer rod VII-0310 and the buffer spring VII-0311 are mounted between the electric screwdriver mounting plate VII-0309 and the buffer plate VII-0303, and the buffer rod VII-0310 is threadedly connected with the electric screwdriver mounting plate VII-0309. The buffer spring VII-0311 is sleeved on the buffer rod VII-0310. When the nut dismounting device VII-03 works, the nut dismounting cylinder VII-0307 acts, the piston rod extends out to drive the electric screwdriver VII-0308 to move through the electric screwdriver mounting plate VII-0309. When the outer hexagon wrench VII-0312 reaches a designated position, the electric screwdriver VII-0308 drives the outer hexagon wrench VII-0312 to rotate to unscrew the inner hexagon screw I-020208 on the squirrel-cage tooling I-0202. The buffer rod VII-0310 can prevent the outer hexagon wrench VII-0312 from colliding with the squirrel-cage tooling I-0202, and plays a role in buffering.

Figure 25:
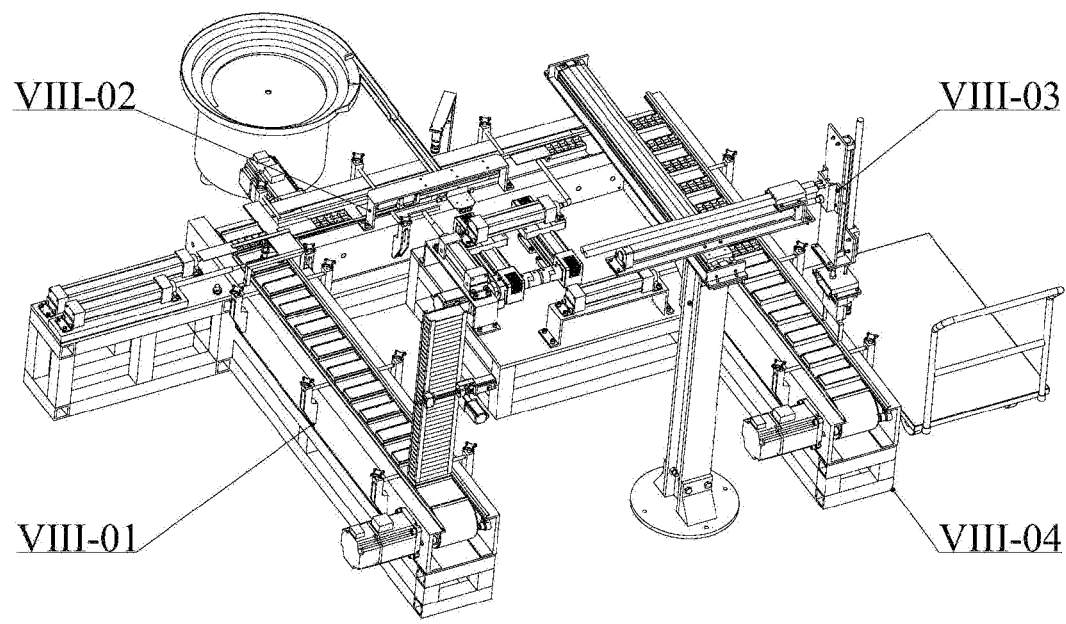
FIG. 25 is an axonometric drawing of a blade boxing device according to one or more embodiments of the present disclosure.

As shown in FIG. 25, the blade boxing device VIII includes a blade-box cover-opening mechanism VIII-01, a blade boxing mechanism VIII-02, a stacking mechanism VIII-03 and a blade-box cover-closing mechanism VIII-04. The blade-box cover-opening mechanism VIII-01 is located at one end of the blade boxing mechanism VIII-02, and the blade-box cover-closing mechanism VIII-04 is located at the other end of the blade boxing mechanism VIII-02. The stacking mechanism VIII-03 is located on one side of the blade-box cover-closing mechanism VIII-04. The blade-box cover-opening mechanism VIII-01 is used for opening the blade box and transferring the blade box after being opened to the blade boxing mechanism VIII-02. The blade boxing mechanism VIII-02 is used for putting the blades into the blade box and transferring the blade box after loading with blades to the blade-box cover-closing mechanism VIII-04. The blade-box cover-closing mechanism VIII-04 is used for closing the cover of the blade box that is loaded with the blades. The blade box is stacked by the stacking mechanism VIII-03.

Figure 26:
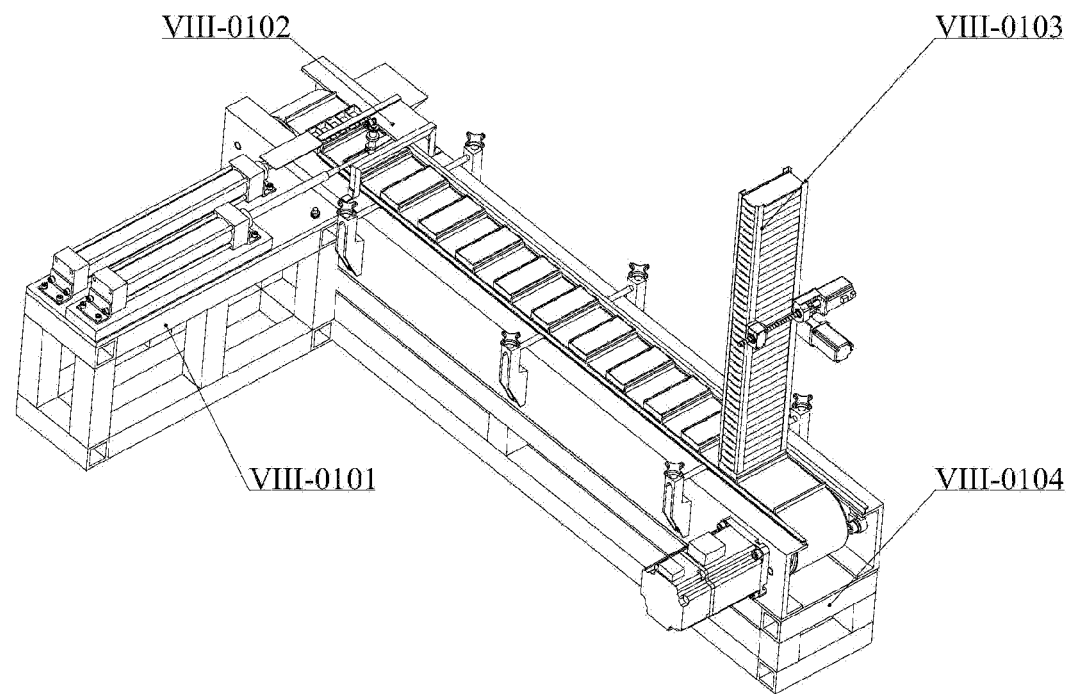
FIG. 26 is an axonometric drawing of a blade-box cover-opening mechanism according to one or more embodiments of the present disclosure.

As shown in FIG. 26, the blade-box cover-opening mechanism VIII-01 includes a cover opening and box pushing device VIII-0101, a device with inclined surfaces VIII-0102, a blade-box stock bin VIII-0103 and a blade-box inputting and conveying device VIII-0104. The blade-box stock bin VIII-0103 is located above the blade-box inputting and conveying device VIII-0104 and used for storing empty blade boxes. The blade-box inputting and conveying device VIII-0104 can convey the blade boxes to the cover opening and box pushing device VIII-0101. The cover opening and box pushing device VIII-0101 is mounted vertically to the blade-box inputting and conveying device VIII-0104, and the device with inclined surfaces VIII-0102 is mounted above the blade-box inputting and conveying device VIII-0104. The covers of the blade boxes can be opened under the actions of the cover opening and box pushing device VIII-0101, the device with inclined surfaces VIII-0102 and the blade-box inputting and conveying device VIII-0104. The blade boxes are conveyed to the blade boxing mechanism VIII-02 through the cover opening and box pushing device VIII-0101.

Further, the cover opening and box pushing device VIII-0101 includes a support, a push-in cylinder and a cover-opening cylinder. The push-in cylinder and the cover-opening cylinder are parallel to each other and fixed to an upper portion of the support. The push-in cylinder is connected with a T-shaped push rod, and a vacuum chuck assembly is mounted at an end of the cover opening cylinder. The device with inclined surfaces VIII-0102 includes an inclined block and an inclined block support. The inclined block is fixed to one end of the blade-box inputting and conveying device VIII-0104 through the inclined block support. The blade-box inputting and conveying device VIII-0104 is a timing belt mechanism.

Figure 27:
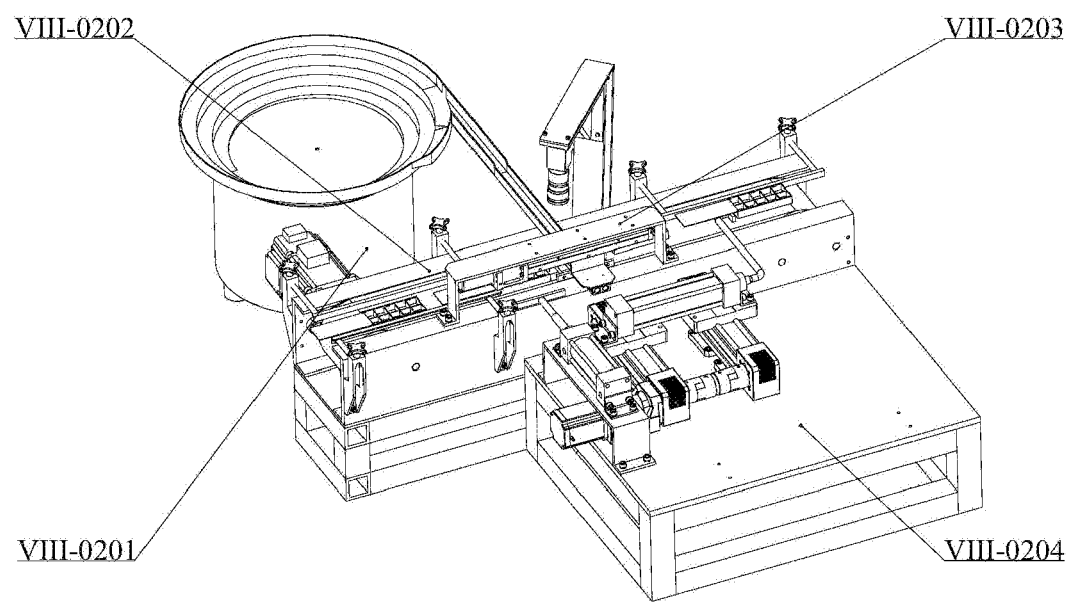
FIG. 27 is an axonometric drawing of a blade boxing mechanism according to one or more embodiments of the present disclosure.

As shown in FIG. 27, the blade boxing mechanism VIII-02 includes a vibrated loading device VIII-0201, a blade-box conveying device VIII-0202, a blade boxing device VIII-0203 and a blade-box pushing device VIII-0204. The blade box-entering device VIII-0203 is mounted above the blade-box conveying device VIII-0202. The blade box-entering device VIII-0203 and the blade-box pushing device VIII-0204 are arranged in parallel. The vibrated loading device VIII-0201 is used for conveying the blades to the blade boxing device VIII-0203 after the blades are arranged in order. The blade boxes are conveyed to the blade boxing device VIII-0203 by the blade-box conveying device VIII-0202, after covers of the blade boxes are opened. The blades are loaded into the blade boxes under combined actions of the blade box-entering device VIII-0203, the vibrated loading device VIII-0201 and the blade-box pushing device VIII-0204. Finally, the blade boxes which are loaded with the blades are conveyed to a blade-box cover-closing device VIII-04 through the blade-box pushing device VIII-0204.

Figure 28:
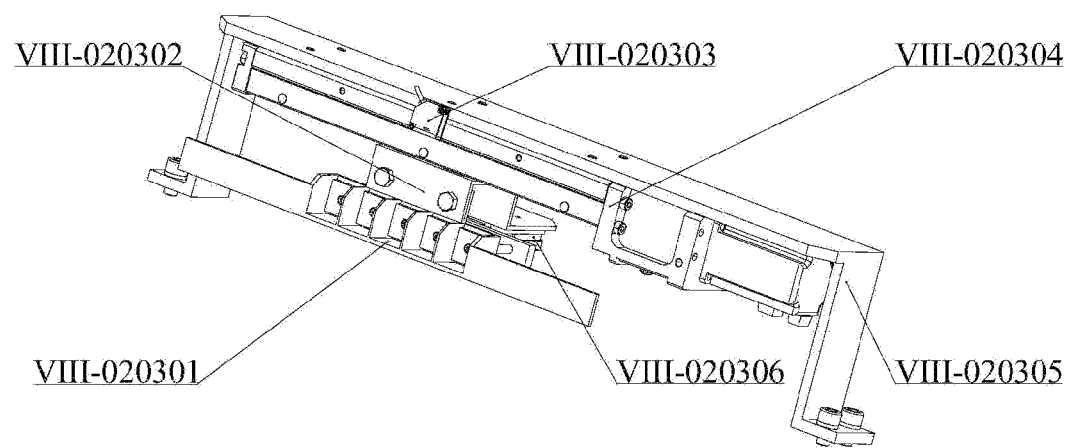
FIG. 28 is a schematic structural diagram of a blade-entering-box device according to one or more embodiments of the present disclosure.

Further, as shown in FIG. 28, the blade box-entering device VIII-0203 includes a blade-loading groove VIII-020301, a linear module support VIII-020305, a linear module VIII-020304, a blade detection sensor VIII-020303, a blade-groove connecting plate VIII-020302 and a double-shaft cylinder VIII-020306. The linear module VIII-020304 is mounted inside the linear module VIII-020305. The blade detection sensor VIII-020303 is mounted on one side of the linear module VIII-020304. The blade-loading groove VIII-020301 is formed on one side of the linear module support VIII-020305. The blade-loading groove VIII-020301 is connected with the double-shaft cylinder VIII-020306 through the blade-groove connecting plate VIII-020302. The blade-groove connecting plate VIII-020302 is connected to the lower portion of the linear module VIII-020304. A piston rod of the double-shaft cylinder VIII-020306 can push out the blades located in the blade-loading groove VIII-020301.

Figure 29:
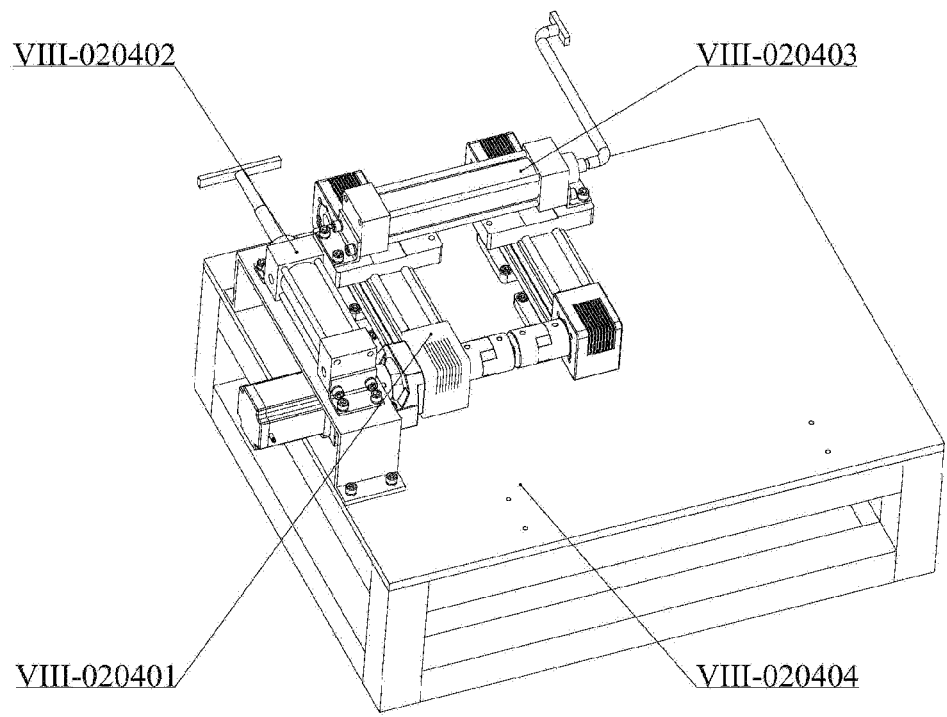
FIG. 29 is an axonometric drawing of a blade-box pushing device according to one or more embodiments of the present disclosure.

As shown in FIG. 29, the blade-box pushing device VIII-0204 includes a support VIII-020404, a cylinder for forward pushing VIII-020402 mounted above the support VIII-020404, a cylinder for pushing out VIII-020403 and a double-arm linear module VIII-020401. The cylinder for pushing out VIII-020403 is mounted on a sliding block of the double-arm linear module VIII-020401, and can move along with the sliding block of the double-arm linear module. The cylinder for forward pushing VIII-020402 is located on one side of the pushing-out cylinder VIII-020403.

Figure 30:
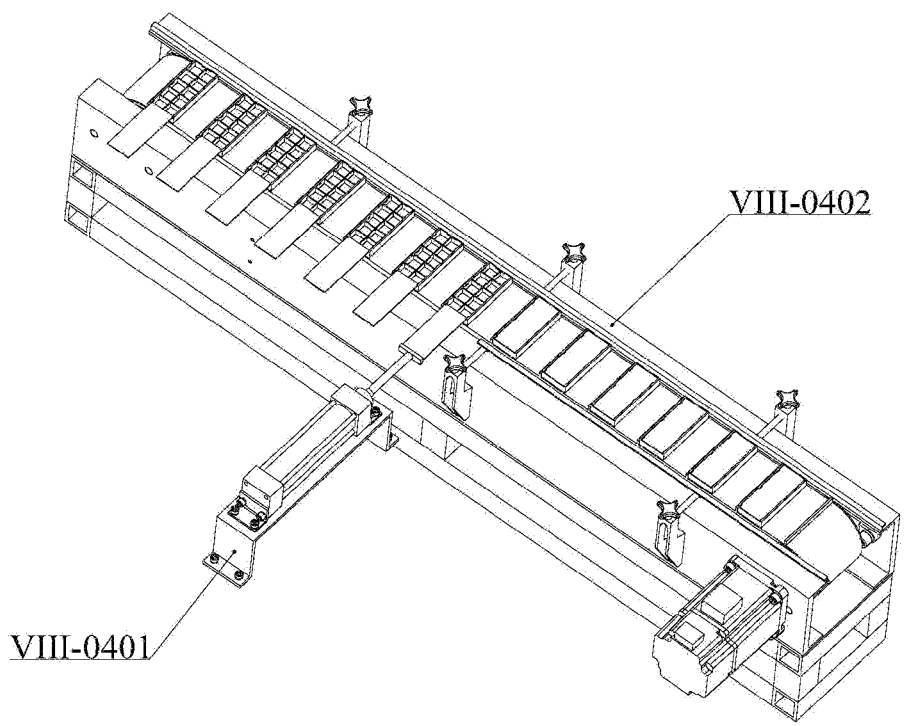
FIG. 30 is an axonometric drawing of a blade-box cover-closing mechanism according to one or more embodiments of the present disclosure.

As shown in FIG. 30, the blade-box cover-closing mechanism VIII-04 includes a blade-box cover-closing device VIII-0401 and a blade-box outputting and conveying device VIII-0402. The blade-box cover-closing device VIII-0401 is mounted vertically to the blade-box outputting and conveying device VIII-0402. The blade-box outputting and conveying device adopts the timing belt mechanism. The blade-box cover-closing device VIII-0401 includes a cylinder and a push rod connected to an end of the cylinder. The blade boxes which are loaded with the blades are conveyed to the blade-box cover-closing device VIII-0401 by the blade-box outputting and conveying device VIII-0402. The covers of the blade boxes are closed under the combined actions of the blade-box cover-closing device VIII-0401 and the blade-box outputting and conveying device VIII-0402, and then stacking operation is carried out.

Figure 31:
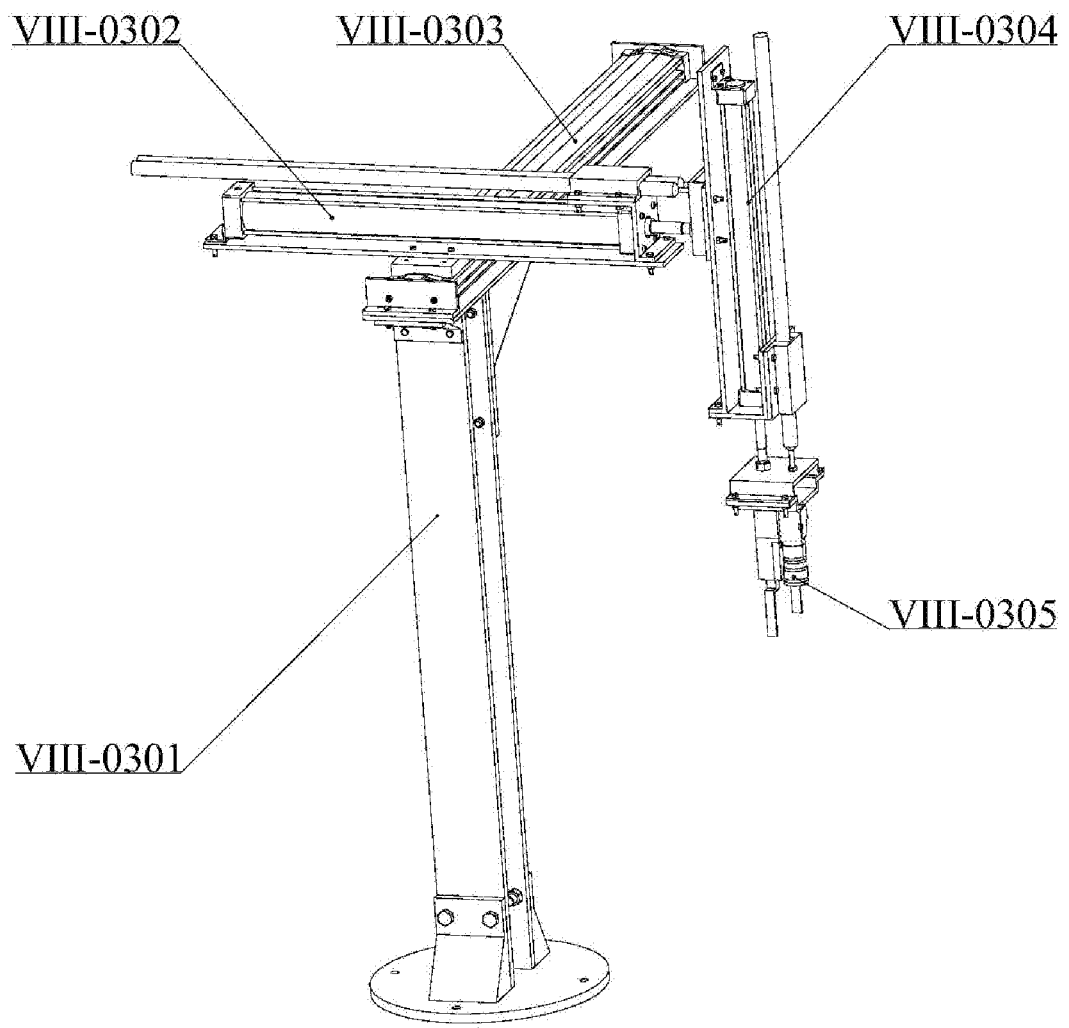
FIG. 31 is an axonometric drawing of a stacking mechanism according to one or more embodiments of the present disclosure.

As shown in FIG. 31, the stacking mechanism VIII-03 includes a stacking-assembly support frame VIII-0301, an X-direction moving device VIII-0302, a Y-direction moving device VIII-0303, a Z-direction moving device VIII-0304 and a clamping assembly VIII-0305. The stacking-assembly support frame VIII-0301 is mounted on the ground and plays a role in supporting other parts. The Y-direction moving device VIII-0303 is mounted on the stacking-assembly support frame VIII-0301, the X-direction moving device VIII-0302 is mounted on a sliding block of the Y-direction moving device VIII-0303, and the Z-direction moving device VIII-0304 is mounted on a connecting block at a front end of the X-direction moving device VIII-0302. The clamping assembly VIII-0305 is mounted on a connecting block at a front end of the Z-direction moving device VIII-0304. The clamping assembly VIII-0305 can be controlled by the Y-direction moving device VIII-0303, the X-direction moving device VIII-0302 and the clamping assembly VIII-0305 to move within a certain space range. Meanwhile, an industrial camera is mounted on the clamping assembly VIII-0305, so the clamping assembly VIII-0305 has clamping and visual recognition functions, which can achieve the stacking of the boxed blade boxes. In the embodiment, the X-direction moving device VIII-0302, the Y-direction moving device VIII-0303 and the Z-direction moving device VIII-0304 are all linear modules, and the clamping assembly VIII-0305 is a finger cylinder.

Figure 32:
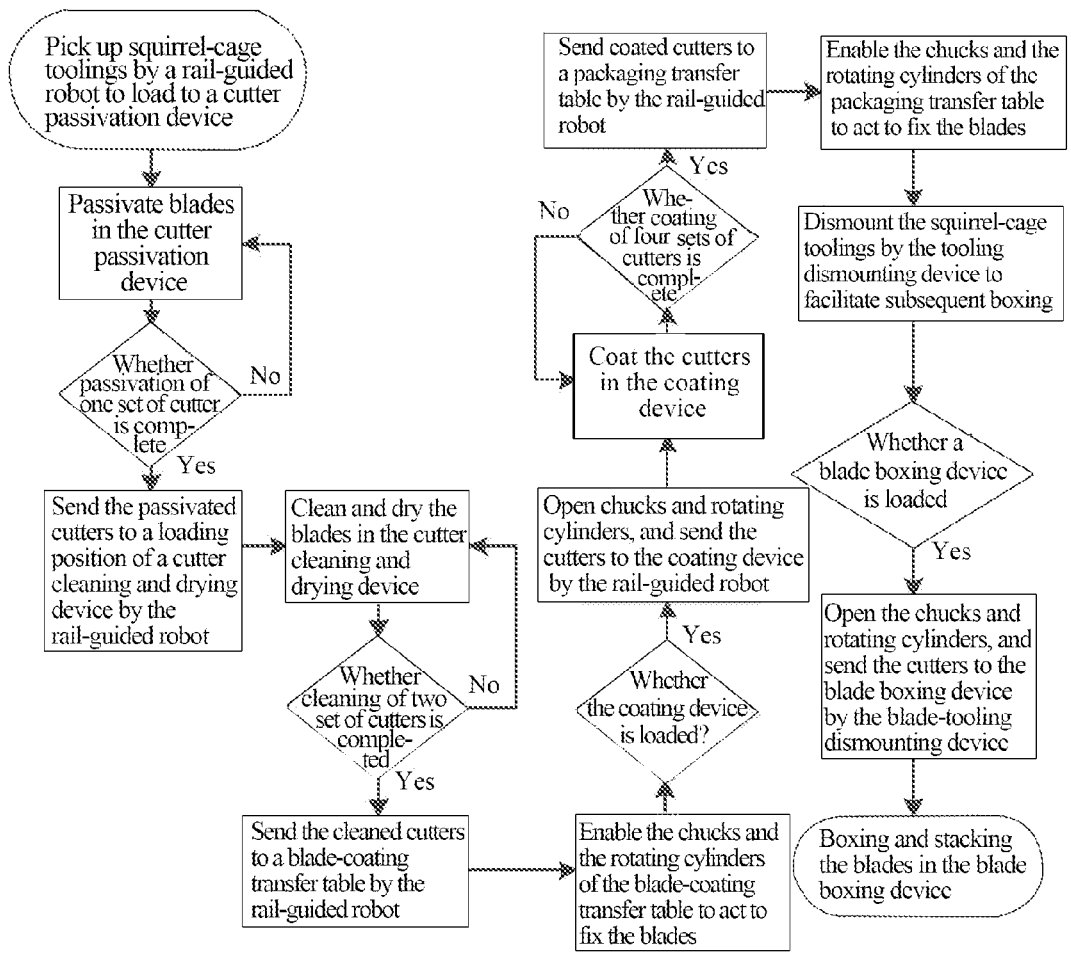
FIG. 32 is a workflow chart according to one or more embodiments of the present disclosure.

The work flow of the production line in the embodiment is as shown in FIG. 32. In an initial state, the blades are conveyed to the cutter passivation device I for passivation by the rail-guided robot III, the carrier of the blades is the squirrel-cage tooling I-0202, and the squirrel-cage tooling I-0202 is connected with the cutter passivation device I through splines. After the blades on one set of squirrel-cage tooling I-0202 are passivated, the blades are transferred from the cutter passivation device I to the cleaning line tooling II-05 at the loading position of the blade cleaning and drying device II by the rail-guided robot III. After the cleaning line tooling II-05 is loaded with the two sets of squirrel-cage toolings I-0202, the cleaning and drying procedures are sequentially carried out. After drying is completed, the cleaning line tooling II-05 is transported to the unloading position, and the two sets of blades are transferred from the unloading position to the blade-coating transfer table IV by the rail-guided robot III.

The pneumatic chucks and the rotating cylinders of the blade-coating transfer table IV act to fix the squirrel-cage toolings I-0202 loaded with the blades. When the cutter coating device I needs to be loaded, the blades at the blade-coating transfer table IV are transferred to the blade coating device V by the rail-guided robot III. The blade coating device V can perform coating operation on the four sets of blades, during the blade coating device V works every time. The blades after being coated are transferred to the blade boxing transfer table VI through the rail-guided robot III. The pneumatic chucks and the rotating cylinders of the blade boxing transfer table VI act to fix the squirrel-cage toolings I-0202. Then, the squirrel-cage toolings I-0202 are dismounted by the blade-tooling dismounting device VII, so as to facilitate the subsequent blade boxing. When the blade boxing device VIII needs to be loaded, the blade-tooling dismounting device VII can clamp the dismounted squirrel-cage tooling I-0202, the coated blades are poured into a vibration loading disc of the blade boxing device VIII, and empty squirrel-cage toolings I-0202 and parts that are previously dismounted from the toolings are placed at a fixed collecting position.

The foregoing descriptions are merely exemplary embodiments of the present disclosure, but are not intended to limit the present disclosure, and for the skill in the art, the present disclosure can be of various modifications and changes. Any modification, equivalent replacement, or improvement made without departing from the spirit and principle of this application shall fall within the protection scope of this application.

What is claimed is:

1. A multi-procedure integrated automatic production line for hard alloy blades under robot control, the automatic production line comprising a rail-guided robot, wherein a cutter passivation device and a blade cleaning and drying device are arranged on one side of the rail-guided robot; a blade-coating transfer table, a blade coating device, a blade boxing transfer table, a blade-tooling dismounting device and a blade boxing device are sequentially arranged on an other side of the rail-guided robot; and the blade-tooling dismounting device is arranged on one side of the blade boxing transfer table;

the automatic production line further comprises squirrel-cage toolings for carrying blades; through the rail-guided robot, the squirrel-cage toolings loaded with the blades are enabled to move among the cutter passivation device, the blade cleaning and drying device, the blade-coating transfer table and the blade boxing transfer table; and the blades treated by the blade-tooling dismounting device are sent to the blade boxing device.

2. The multi-procedure integrated automatic production line for hard alloy blades under robot control according to claim 1, wherein the cutter passivation device comprises a passivation-device shell, a rotating disc mechanism, a spray gun mechanism and a grinding-material backflow mechanism; the rotating disc mechanism is mounted inside the passivation-device shell; the spray gun mechanism is mounted at a top of the passivation-device shell, and the grinding-material backflow mechanism is mounted on one side of the passivation-device shell.

3. The multi-procedure integrated automatic production line for hard alloy blades under robot control according to claim 2, wherein the rotating disc mechanism comprises a rotating disc transmission assembly, a stepping motor, tooling rotating assemblies and a large rotating disc; the stepping motor is connected with the large rotating disc and located above the large rotating disc; the tooling rotating assemblies used for connecting the squirrel-cage toolings are mounted at an edge of an upper surface of the large rotating disc; and the tooling rotating assemblies are connected with the rotating disc transmission assembly.

4. The multi-procedure integrated automatic production line for hard alloy blades under robot control according to claim 2, wherein a collecting hopper is arranged at a bottom of the passivation-device shell; the grinding-material backflow mechanism is arranged on a side of the collecting hopper; the grinding-material backflow mechanism comprises a blow-off pipe and a sand pumping pipe; an outlet side of a grinding fluid pipe extending out of a bottom of the collecting hopper is connected with a grinding fluid pump; and an other side of the grinding fluid pipe is connected with the blow-off pipe; the grinding fluid pump is connected with the sand pumping pipe; and the sand pumping pipe is connected with a sand discharge pipe device.

5. The multi-procedure integrated automatic production line for hard alloy blades under robot control according to claim 1, wherein the blade cleaning and drying device comprises a cleaning line support and a cleaning pool mounted above the cleaning line support; a cleaning line conveying belt is arranged on sides of the cleaning pool; a plurality of cleaning line tooling frames used for placing the squirrel-cage toolings are arranged on the cleaning line conveying belt; and a lifting device used for lifting the cleaning line tooling frames is mounted on one side of the cleaning line support.

6. The multi-procedure integrated automatic production line for hard alloy blades under robot control according to claim 5, wherein the cleaning pool comprises high-pressure flushing pools, drying pool assemblies and rinsing pools which are sequentially arranged; each of the drying pool assemblies comprises an ultrasonic cleaning pool, a clean water rinsing pool and an ultrasonic rinsing pool which are sequentially arranged; and a rinsing assembly is arranged below the clean water rinsing pool;

the rinsing assembly comprises rinsing cross rods, each of the rinsing cross rods is fixed with a plurality of lifting parts; two ends of each of the rinsing cross rods are connected with up-and-down moving shafts; each of the up-and-down moving shafts are slidably connected with relatively immovable linear bearings; a bottom end of each of the up-and-down moving shafts is hinged to one end of a transmission rod; an other end of the transmission rod is hinged to one end of a triangular plate; and the triangular plate is rotated within a predetermined angle range.

7. The multi-procedure integrated automatic production line for hard alloy blades under robot control according to claim 1, wherein the blade coating device comprises a coating chamber; a plurality of planar target devices are mounted on inner walls of the coating chamber; fin heating pipes are mounted on side faces of the coating chamber; a rotating disc assembly is mounted in the coating chamber; a cooler is mounted at a top of the coating chamber; the coating chamber is connected with a gas tank and a diffusion pump; and the diffusion pump is connected with a vacuum pump and a roots vacuum pump.

8. The multi-procedure integrated automatic production line for hard alloy blades under robot control according to claim 1, wherein the blade boxing device comprises a blade-box cover-opening mechanism, a blade boxing mechanism, a stacking mechanism and a blade-box cover-closing mechanism; the blade-box cover-opening mechanism is located at one end of the blade boxing mechanism; the blade-box cover-closing mechanism is located at an other end of the blade boxing mechanism; and the stacking mechanism is located on one side of the blade-box cover-closing mechanism.

9. The multi-procedure integrated automatic production line for hard alloy blades under robot control according to claim 8, wherein the blade-box cover-opening mechanism comprises a cover opening and box pushing device, a blade-box stock bin and a blade-box inputting and conveying device; the blade-box stock bin is located above the blade-box inputting and conveying device; the cover opening and box pushing device is located on one side of the blade-box inputting and conveying device; the blade boxing mechanism comprises a vibrated loading device, a blade-box conveying device, a blade-entering-box device and a blade-box pushing device; the blade-entering-box device is mounted above the blade-box conveying device; and the blade-entering-box device and the blade-box pushing device are arranged in parallel.

10. The multi-procedure integrated automatic production line for hard alloy blades under robot control according to claim 1, wherein the blade-coating transfer table comprises a transfer table support and a plurality of pneumatic chucks mounted above the transfer table support; the pneumatic chucks are used for fixing the squirrel-cage toolings; the blade-tooling dismounting device comprises a clamping device, a tooling-dismounting visual device, a nut dismounting device and a tooling-dismounting robot; and the clamping device, the tooling-dismounting visual device and the nut dismounting device are mounted at a tail end of the tooling-dismounting robot.

\* \* \* \* \*